United States Patent
Shimizu et al.

(10) Patent No.: US 10,687,222 B2
(45) Date of Patent: Jun. 16, 2020

(54) BASE STATION DEVICE, TERMINAL DEVICE AND TRANSMISSION CONTROL METHOD

(71) Applicant: PANASONIC CORPORATION, Osaka (JP)

(72) Inventors: Noriyuki Shimizu, Kanagawa (JP); Osamu Katou, Fukuoka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/329,459

(22) PCT Filed: Feb. 28, 2017

(86) PCT No.: PCT/JP2017/007949
§ 371 (c)(1),
(2) Date: Feb. 28, 2019

(87) PCT Pub. No.: WO2017/042714
PCT Pub. Date: Mar. 8, 2018

(65) Prior Publication Data
US 2019/0223174 A1    Jul. 18, 2019

(30) Foreign Application Priority Data
Sep. 1, 2016    (JP) .................... 2016-170431

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0695* (2013.01); *H04W 64/006* (2013.01);
(Continued)

(58) Field of Classification Search
CPC .............................. H04W 16/28; H04B 7/0695
See application file for complete search history.

(56) References Cited

U.S. PATENT DOCUMENTS

2004/0204110 A1* 10/2004 Davidson ............... H01Q 1/246
455/562.1
2008/0310380 A1* 12/2008 Wullich ................ H04W 28/18
370/338
(Continued)

FOREIGN PATENT DOCUMENTS

| JP | 2009-049756 | 3/2009 |
| JP | 2009-296132 | 12/2009 |

(Continued)

OTHER PUBLICATIONS

International Search Report (ISR) from International Searching Authority (Japan Patent Office) in International Pat. Appl. No. PCT/JP2017/007949, dated May 30, 2017.

*Primary Examiner* — Gary Mui
(74) *Attorney, Agent, or Firm* — Greenblum & Bernstein, P.L.C.

(57) ABSTRACT

In order to shorten a waiting time until a user terminal receives a down signal transmitted from a base station apparatus and ensure that a transmission beam is transmitted to a direction towards where one or more user terminals are present, a base station for time-divisionally transmitting a down signal to multiple user terminals present in a cell concurrently with changing a transmission beam direction where the down signal is common to the multiple user terminals is provided and includes a wireless communicator configured to time-divisionally transmit the down signal concurrently with changing the transmission beam direction, an information storage configured to store transmission schedule information which specifies transmission timing of the transmission beam, and a controller configured to con- (Continued)

trol, based on the transmission schedule information, the transmission beams when the base station transmits the down signal.

12 Claims, 16 Drawing Sheets

(51) Int. Cl.
*H04W 64/00* (2009.01)
*H04W 72/04* (2009.01)
*H04W 72/12* (2009.01)

(52) U.S. Cl.
CPC ..... *H04W 72/048* (2013.01); *H04W 72/0446* (2013.01); *H04W 72/121* (2013.01)

(56) References Cited

U.S. PATENT DOCUMENTS

| | | |
|---|---|---|
| 2011/0003560 A1 | 1/2011 | Futaki et al. |
| 2012/0113852 A1 | 5/2012 | Xu et al. |
| 2016/0021650 A1* | 1/2016 | Chembil-Palat ...... H04W 8/005 455/434 |
| 2017/0273062 A1* | 9/2017 | Liu ........................ H04W 24/10 |
| 2017/0311180 A1* | 10/2017 | Jalden ................... H04W 24/10 |
| 2017/0374637 A1* | 12/2017 | Akkarakaran ....... H04B 7/0617 |

FOREIGN PATENT DOCUMENTS

| | | |
|---|---|---|
| JP | 2012-527136 | 11/2012 |
| WO | 2009/110551 | 9/2009 |
| WO | 2015/025839 | 2/2015 |

\* cited by examiner

Fig.5 historical information

| beam ID | number of present users | | | | user presence ratio (%) |
|---|---|---|---|---|---|
| | #1 | #2 | #3 | ... | |
| ID00 | 0 | 0 | 0 | ... | 0 |
| ID01 | 0 | 0 | 0 | ... | 0 |
| ID02 | 0 | 0 | 0 | ... | 0 |
| ID03 | 0 | 0 | 0 | ... | 0 |
| ID04 | 0 | 0 | 0 | ... | 0 |
| ID05 | 0 | 0 | 1 | ... | 5 |
| ID06 | 0 | 0 | 0 | ... | 14 |
| ID07 | 2 | 2 | 4 | ... | 100 |
| ID08 | 1 | 2 | 1 | ... | 51 |
| ID09 | 0 | 1 | 0 | ... | 10 |
| ID10 | 0 | 0 | 0 | ... | 0 |
| ID11 | 0 | 0 | 0 | ... | 0 |
| ID12 | 0 | 0 | 0 | ... | 0 |
| ID13 | 0 | 0 | 0 | ... | 0 |
| ID14 | 0 | 0 | 0 | ... | 0 |
| ID15 | 0 | 0 | 0 | ... | 4 |
| ID16 | 0 | 0 | 0 | ... | 0 |
| ID17 | 0 | 0 | 0 | ... | 0 |
| ID18 | 0 | 1 | 1 | ... | 3 |
| ID19 | 0 | 0 | 0 | ... | 0 |
| ID20 | 0 | 0 | 0 | ... | 0 |
| ID21 | 0 | 0 | 0 | ... | 0 |
| ID22 | 0 | 0 | 0 | ... | 0 |
| ID23 | 0 | 0 | 0 | ... | 0 |
| ID24 | 0 | 0 | 0 | ... | 0 |
| ID25 | 0 | 1 | 0 | ... | 10 |
| ID26 | 3 | 3 | 2 | ... | 69 |
| ID27 | 2 | 1 | 0 | ... | 31 |
| ID28 | 0 | 1 | 0 | ... | 12 |
| ID29 | 0 | 0 | 0 | ... | 0 |
| ID30 | 0 | 0 | 0 | ... | 0 |
| ID31 | 0 | 0 | 0 | ... | 0 |

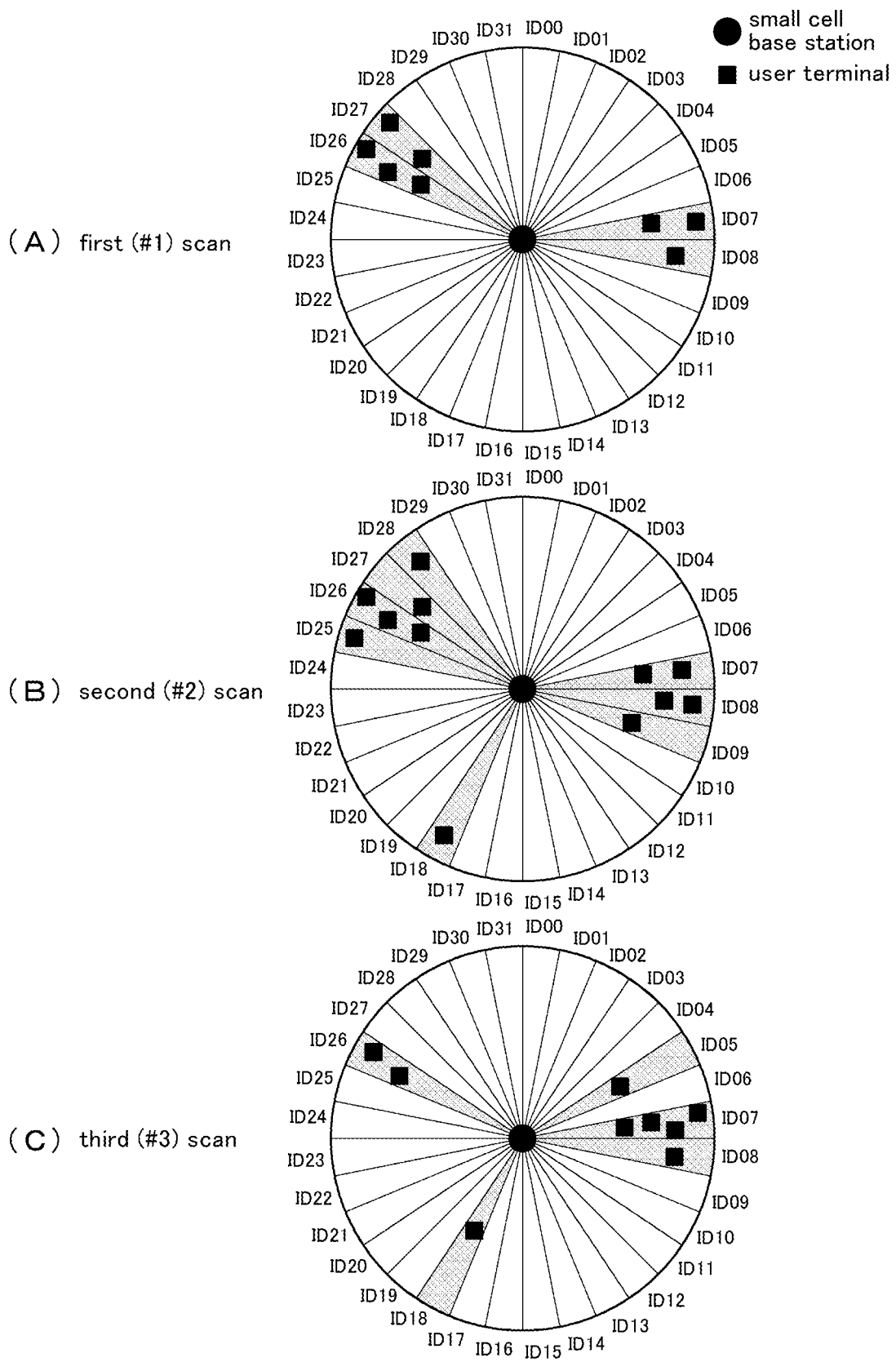

Fig.7 transmission schedule information

| beam ID | #1 | #2 | #3 | #4 | #5 | #6 | #7 | #8 | #9 | #10 | ... | #N |
|---|---|---|---|---|---|---|---|---|---|---|---|---|
| ID00 | — | — | — | — | — | — | — | — | — | — | ... | trans |
| ID01 | — | — | — | — | — | — | — | — | — | — | ... | trans |
| ID02 | — | — | — | — | — | — | — | — | — | — | ... | trans |
| ID03 | — | — | — | — | — | — | — | — | — | — | ... | trans |
| ID04 | — | — | — | — | — | — | — | — | — | — | ... | trans |
| ID05 | trans | — | — | — | — | — | — | — | — | — | ... | trans |
| ID06 | trans | — | — | — | — | trans | — | — | — | — | ... | trans |
| ID07 | trans | trans | trans | trans | trans | trans | trans | trans | trans | trans | ... | trans |
| ID08 | trans | — | trans | — | trans | — | — | trans | — | — | ... | trans |
| ID09 | trans | — | — | — | — | — | trans | — | — | — | ... | trans |
| ID10 | — | — | — | — | — | — | — | — | — | — | ... | trans |
| ID11 | — | — | — | — | — | — | — | — | — | — | ... | trans |
| ID12 | — | — | — | — | — | — | — | — | — | — | ... | trans |
| ID13 | — | — | — | — | — | — | — | — | — | — | ... | trans |
| ID14 | — | — | — | — | — | — | — | — | — | — | ... | trans |
| ID15 | trans | — | — | — | — | — | — | — | — | — | ... | trans |
| ID16 | — | — | — | — | — | — | — | — | — | — | ... | trans |
| ID17 | — | — | — | — | — | — | — | — | — | — | ... | trans |
| ID18 | trans | — | — | — | — | — | — | — | — | — | ... | trans |
| ID19 | — | — | — | — | — | — | — | — | — | — | ... | trans |
| ID20 | — | — | — | — | — | — | — | — | — | — | ... | trans |
| ID21 | — | — | — | — | — | — | — | — | — | — | ... | trans |
| ID22 | — | — | — | — | — | — | — | — | — | — | ... | trans |
| ID23 | — | — | — | — | — | — | — | — | — | — | ... | trans |
| ID24 | — | — | — | — | — | — | — | — | — | — | ... | trans |
| ID25 | trans | — | — | — | — | — | — | — | — | — | ... | trans |
| ID26 | trans | — | trans | — | trans | — | trans | — | trans | — | ... | trans |
| ID27 | trans | — | — | trans | — | — | trans | — | — | trans | ... | trans |
| ID28 | trans | — | — | — | — | — | — | — | — | — | ... | trans |
| ID29 | — | — | — | — | — | — | — | — | — | — | ... | trans |
| ID30 | — | — | — | — | — | — | — | — | — | — | ... | trans |
| ID31 | — | — | — | — | — | — | — | — | — | — | ... | trans |

Fig.12

BASE STATION DEVICE, TERMINAL DEVICE AND TRANSMISSION CONTROL METHOD

TECHNICAL FIELD

The present invention relates to a base station apparatus for time-divisionally transmitting a down signal to terminal apparatuses and/or subordinate base station apparatus present in a cell concurrently with changing a transmission beam direction wherein the down signal is common to the multiple terminal apparatuses and the multiple subordinate base station apparatuses; a terminal apparatus for transmitting an up signal to and receiving a down signal from a base station apparatus; and a transmission control method used in a base station apparatus for time-divisionally transmitting a down signal to multiple terminal apparatuses present in a cell concurrently with changing a transmission beam direction wherein the down signal is common to the multiple terminal apparatuses.

BACKGROUND ART

Recently, adopting Massive-MIMO (Multiple Input Multiple Output) utilizing multi-element antennas in 5G systems (fifth generation mobile communication systems) is under consideration. In order for Massive-MIMO to fully function, a base station desirably performs beam forming, i.e. controlling formation of transmission beams for transmission of a control signal for synchronization in the same manner as transmission of data signals, when performing a cell search to determine an optimum base station for each user terminal to make a connection with. Carrying out such beam forming for transmission of a control signal for synchronization allows reachable distance of the control signal to be extended in the same manner as beam forming for transmission of a data signal, thereby enabling avoidance of ineffective utilization of a communication area for data signals, which ineffective utilization is caused because a user terminal, even after entering into the communication area, cannot properly receive a control signal for synchronization.

Examples of known techniques for adopting beam forming for transmission of such a control signal for synchronization include a method including transmitting a control signal for synchronization from a base station concurrently with forming transmission beams so as to make a rotation of the beam direction; that is, time-divisionally transmitting a control signal for synchronization concurrently with changing in a stepwise manner. (See Patent Document 1)

PRIOR ART DOCUMENT(S)

Patent Document(S)

Patent Document 1: WO2015/025839A

SUMMARY OF THE INVENTION

Task to be Accomplished by the Invention

However, when time-divisionally transmitting a control signal for synchronization by forming transmission beams so as to make a rotation of a beam direction as taught in the above-described prior art document, it takes a longer time to complete each scan by transmitting the control signal for synchronization over an entirety of a cell, resulting in a longer waiting time until each user terminal receives the control signal for synchronization, which means it takes a longer time to attain synchronization, causing a problem that time for user data transmission is made shorter to thereby lower throughput.

In order to address this problem, the above-described prior art utilizes frequency multiplexing and spatial multiplexing of beams to reduce processing load. However, this method inconveniently requires more resources to be used as control channels, leading to lower throughput. Moreover, the above-described prior art, in which a beam width is adjusted in a stepwise manner when performing a scan, involves a problem that a transmission beam direction cannot always be controlled to be a proper direction towards where one or more user terminals are present because reachable distance of the transmission beams varies depending on the beam width and each user terminal can move.

The present invention has been made in view of such problems of the prior art, and a primary object of the present invention is to provide a base station apparatus, a terminal apparatus, and a transmission control method used in a base station apparatus, which shortens a waiting time until a terminal apparatus receives a signal transmitted in a time-divisional manner from a base station apparatus and ensures that a transmission beam is transmitted to a direction towards where one or more terminal apparatuses are present.

Means to Accomplish the Task

An aspect of the present invention provides a base station apparatus for time-divisionally transmitting a down signal to a plurality of terminal apparatuses present in a communication area concurrently with changing a transmission beam direction, the down signal being common to the plurality of terminal apparatuses, comprising:

a wireless communicator configured to time-divisionally transmit the down signal concurrently with changing the transmission beam direction;

an information storage configured to store transmission schedule information which specifies transmission timing of transmission beams, wherein the transmission timing is determined based on historical information on presence or absence of one or more of the terminal apparatuses in respective sectors, each sector being part of a reachable area of past transmission beams, in such a manner as to eliminate transmission of the transmission beam to a sector with a lower frequency of presence of one or more of the terminal apparatuses; and a controller configured to control, based on the transmission schedule information, the transmission beams when the base station apparatus transmits the down signal.

Another aspect of the present invention provides a terminal apparatus for transmitting an up signal to and receiving a down signal from a base station apparatus, comprising:

a receiver configured to receive the down signal transmitted from the base station apparatus;

a transmitter configured to transmit, upon receiving the down signal, the up signal to the base station;

an information storage configured to store transmission schedule information which specifies transmission timing of the down signal from the terminal apparatus; and a controller configured to control, based on the transmission schedule information, timing of observation of the down signal at the receiver.

Yet another aspect of the present invention provides a transmission control method used in a base station apparatus for time-divisionally transmitting a down signal to a plurality of terminal apparatuses present in a communication area concurrently with changing a transmission beam direction, the down signal being common to the plurality of terminal apparatuses, comprising the steps of:

collecting historical information on presence or absence of one or more of the terminal apparatuses in respective sectors, each sector being part of a reachable area of past transmission beams;

generating transmission schedule information, wherein the transmission schedule information is determined based on the historical information and specifies transmission timing of transmission beams in such a manner as to eliminate transmission of the transmission beam to a sector with a lower frequency of presence of one or more of the terminal apparatuses; and controlling, based on the transmission schedule information, the transmission beams when the base station apparatus transmits the down signal.

Effect of the Invention

According to the present invention, a down signal is transmitted to terminal apparatuses present in a communication area concurrently with eliminating transmission of transmission beams to sectors with lower frequencies of presence of the terminal apparatuses, which can reduce unnecessary transmission of the transmission beams in directions towards where the terminal apparatuses are not present, thereby shortening a waiting time until the terminal apparatuses receive the down signal. In addition, since unnecessary transmission beams, which are to be eliminated, are determined based on historical information, it is ensured that the transmission beams are transmitted in directions towards where the terminal apparatuses are present.

BRIEF DESCRIPTION OF THE DRAWINGS

FIG. 5 is an explanatory view showing an example of historical information collected by the small cell base station 1;

FIG. 6 is an explanatory view showing examples of situations of how user terminals 3 are present in some sectors;

FIG. 7 is an explanatory diagram showing an example of transmission schedule information generated by the small cell base station 1;

FIG. 12 is an explanatory view showing an example of historical information according to a modification of the first embodiment of the present invention;

DESCRIPTION OF THE PREFERRED EMBODIMENT(S)

Figure 1:
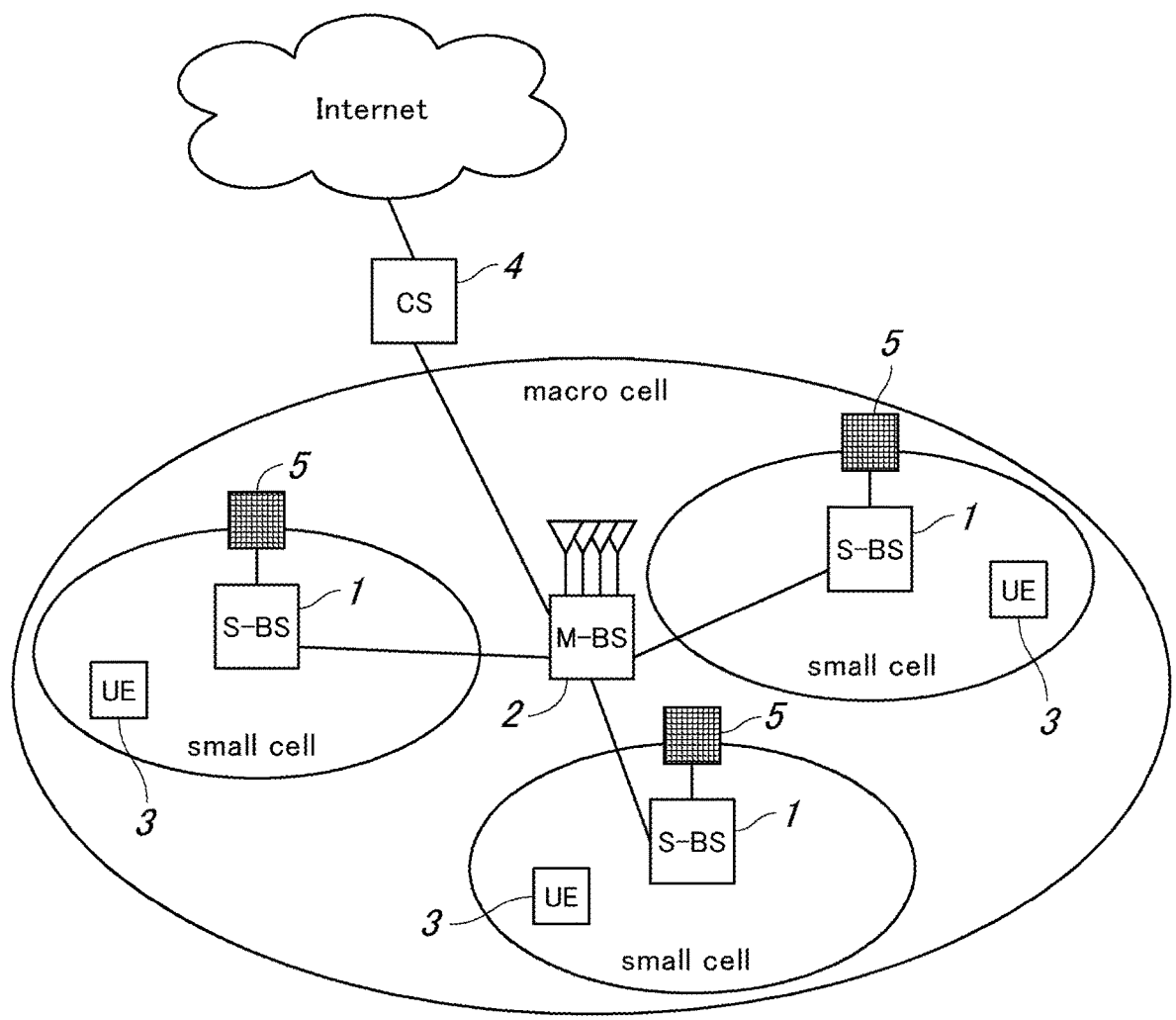
FIG. 1 is a diagram showing a general configuration of a communication system according to a first embodiment of the present invention.

A first aspect of the present invention made to achieve the above-described object is a base station apparatus for time-divisionally transmitting a down signal to a plurality of terminal apparatuses present in a communication area concurrently with changing a transmission beam direction, the down signal being common to the plurality of terminal apparatuses, comprising:

a wireless communicator configured to time-divisionally transmit the down signal concurrently with changing the transmission beam direction;

an information storage configured to store transmission schedule information which specifies transmission timing of transmission beams, wherein the transmission timing is determined based on historical information on presence or absence of one or more of the terminal apparatuses in respective sectors, each sector being part of a reachable area of past transmission beams, in such a manner as to eliminate transmission of the transmission beam to a sector with a lower frequency of presence of one or more of the terminal apparatuses; and a controller configured to control, based on the transmission schedule information, the transmission beams when the base station apparatus transmits the down signal.

According to the first aspect of the present invention, a down signal is transmitted to terminal apparatuses present in a communication area concurrently with eliminating transmission of transmission beams to sectors with lower frequencies of presence of the terminal apparatuses, which can reduce unnecessary transmission of the transmission beams in directions towards where the terminal apparatuses are not present, thereby shortening a waiting time until the terminal apparatuses receive the down signal. In addition, since unnecessary transmission beams, which are to be eliminated, are determined based on historical information, it is ensured that the transmission beams are transmitted in directions towards where the terminal apparatuses are present.

In a second aspect of the present invention, the base station apparatus is configured such that, the transmission schedule information is set so as to increase a frequency of transmission of the transmission beam to a sector with a higher frequency of presence of one or more of the terminal apparatuses and decrease a frequency of transmission of the transmission beam to a sector with a lower frequency of presence of one or more of the terminal apparatuses.

According to the second aspect of the present invention, some transmission beams are transmitted with higher frequencies to sectors with higher frequencies of presence of terminal apparatuses, which shortens time intervals at which each terminal apparatus receives a down signal and reduces the number of terminal apparatuses waiting for the down signal in the same sector, thereby lowering a probability of synchronized transmission of up signals from multiple terminal apparatuses in the same sector to thereby reduce interferences between different up signals.

In a third aspect of the present invention, the base station apparatus is configured such that the transmission schedule information is set such that, during one cycle of a transmission schedule, a plurality of scans are performed over an entirety of the communication area and that, in at least one scan, the transmission beams are transmitted to all the sectors of the communication area.

According to the third aspect of the present invention, it is ensured that, during one cycle in a transmission schedule, all terminal apparatuses present in a communication area can receive a down signal.

In a fourth aspect of the present invention, the base station apparatus is configured such that, the wireless communicator is configured to transmit the down signal, the down signal including a beam ID which identifies a transmission beam, and to receive an up signal including the beam ID extracted from the down signal received at the terminal apparatus; and
  wherein the controller is configured to store the beam ID extracted from the up signal as the historical information in the information storage.

According to the fourth aspect of the present invention, down and up signals including respective beam IDs are transmitted between a base station apparatus and a terminal apparatus such that the beam ID of the terminal apparatus is fed back to the base station apparatus, which enables efficient collection of historical information on sectors in which one or more terminal apparatuses are present.

In a fifth aspect of the present invention, the base station apparatus is configured such that the controller is configured to generate, when a system including the base station apparatus is introduced, an initial piece of the transmission schedule information based on the historical information stored in the information storage during a prescribed collection period, and to periodically update, during normal operations, the transmission schedule information based on the historical information at prescribed timing, the historical information being stored in the information storage.

According to the fifth aspect of the present, invention, since transmission schedule information is periodically updated, the transmission schedule information can be properly maintained even when there is a change in a situation of how terminal apparatuses are present in each sector.

In a sixth aspect of the present invention, the base station apparatus is configured such that the transmission schedule information is set such that, during one cycle of a transmission schedule, a plurality of scans are performed over an entirety of the communication area and that, in at least one scan, the transmission beams are transmitted to all the sectors of the communication area, and
  wherein the controller is configured to update, during normal operations, the transmission schedule information once in each cycle of the transmission schedule.

According to the sixth aspect of the present invention, since, during one cycle of a transmission schedule, terminal apparatuses present in all sectors can receive a down signal at least once, transmission schedule information can be properly maintained.

In a seventh aspect of the present invention, the base station apparatus is configured such that an up signal and the down signal are control signals transmitted and received between the base station apparatus and the a terminal apparatus when the base station apparatus establishes an initial connection with the terminal apparatus after the terminal apparatus is moved into the communication area.

According to the seventh aspect of the present invention, it takes less time to establish an initial connection between a base station apparatus and a terminal apparatus.

In an eighth aspect of the present invention, the base station apparatus is configured such that the up signal and the down signal are control signals transmitted and received between the base station apparatus and a terminal apparatus when a reconnection is established between the base station apparatus and the terminal apparatus after a disconnection occurred therebetween.

According to the eighth aspect of the present invention, it takes less time to establish a reconnection between a base station apparatus and a terminal apparatus after a disconnection occurred therebetween.

In a ninth aspect of the present invention, the base station apparatus is configured such that the transmission schedule information is set based on historical information representing correlations between respective combinations of sectors where disconnections occurred between the base station apparatus and the terminal apparatuses and sectors where reconnections occurred therebetween, and wherein the transmission schedule information is set so as to increase a frequency of transmission of the transmission beam to a sector having a high correlation with another sector where one or more of the terminal apparatuses were present when disconnections occurred between the terminal apparatuses and the base station apparatus.

According to the ninth aspect of the present invention, since a terminal apparatus which was once disconnected from a base station apparatus can receive a down control signal transmitted from the base station apparatus earlier, it takes less time to establish a reconnection between the base station apparatus and the terminal apparatus.

A tenth aspect of the present invention is a base station apparatus for time-divisionally transmitting a down signal to a plurality of subordinate base station apparatuses present in a communication area concurrently with changing a transmission beam direction, the down signal being common to the plurality of subordinate base station apparatuses, comprising:
  a wireless communicator configured to time-divisionally transmit the down signal concurrently with changing the transmission beam direction;
  an information storage configured to store transmission schedule information which specifies transmission timing of transmission beams, wherein the transmission timing is determined based on historical information on presence or absence of one or more of the subordinate base station apparatuses in respective sectors, each sector being part of a reachable area of past transmission beams, in such a manner as to eliminate transmission of the transmission beam to a sector with a lower frequency of presence of one or more of the subordinate base station apparatuses; and
  a controller configured to control, based on the transmission schedule information, the transmission beams when the base station apparatus transmits the down signal.

According to the tenth aspect of the present invention, a waiting time until a user terminal receives a down signal transmitted in a time-divisional manner from a subordinate base station apparatus becomes shorter and it is ensured that the transmission beam is transmitted in a direction where a subordinate base station apparatus are present.

An eleventh aspect of the present invention is a terminal apparatus for transmitting an up signal to and receiving a down signal from a base station apparatus, comprising:
a receiver configured to receive the down signal transmitted from the base station apparatus;
a transmitter configured to transmit, upon receiving the down signal, the up signal to the base station;
an information storage configured to store transmission schedule information which specifies transmission timing of the down signal from the terminal apparatus; and
a controller configured to control, based on the transmission schedule information, timing of observation of the down signal at the receiver.

According to the eleventh aspect of the present invention, since a receiver can be controlled to observe a down signal at the timing of transmission of the down signal from a base station apparatus, the receiver is not required to perform unnecessary receiving operations, thereby allowing efficiently receiving the down signal. In this case, a system is preferably configured such that transmission schedule information held by the base station apparatus is provided to the terminal apparatus via a host apparatus connected to the base station apparatus.

A twelfth aspect of the present invention is a transmission control method used in a base station apparatus for time-divisionally transmitting a down signal to a plurality of terminal apparatuses present in a communication area concurrently with changing a transmission beam direction, the down signal being common to the plurality of terminal apparatuses, comprising the steps of:
collecting historical information on presence or absence of one or more of the terminal apparatuses in respective sectors, each sector being part of a reachable area of past transmission beams;
generating transmission schedule information, wherein the transmission schedule information is determined based on the historical information and specifies transmission timing of transmission beams in such a manner as to eliminate transmission of the transmission beam to a sector with a lower frequency of presence of one or more of the terminal apparatuses; and
controlling, based on the transmission schedule information, the transmission beams when the base station apparatus transmits the down signal.

According to the twelfth aspect of the present invention, a waiting time until a user terminal receives a down signal transmitted in a time-divisional manner from a subordinate base station apparatus becomes shorter and it is ensured that the transmission beam is transmitted in a direction where a subordinate base station apparatus are present as in the first aspect of the present invention.

Embodiments of the present invention will be described below with reference to the drawings.

First Embodiment

FIG. 1 is a diagram showing a general configuration of a communication system according to a first embodiment of the present invention.

The communication system includes small cell base stations 1 (base station apparatuses), a macro cell base station 2, user terminals 3 (terminal apparatuses), and a controller 4.

A small cell base station 1 is a cellular mobile communication system, such as 5G system (fifth generation mobile communication system), configured to carry out wireless communication at a high frequency band such as SHF band (frequency range: 6 GHz to 30 GHz) or EHF band (frequency range: primarily 30 GHz to 60 GHz), and having a cell radius of about 10 m to 3 km, for example. The small cell base station 1 is equipped with a multi-element antenna 5 for use in Massive-MIMO communication systems, and transmission beam forming is performed by the multi-element antenna 5.

The macro cell base station 2 is configured to carry out wireless communication in UHF band (frequency: 300 MHz to 3 GHz) like LTE (Long Term Evolution) communication among various types of cellular mobile communication, and have a longer signal propagation distance than the small cell base stations, e.g. a cell radius of about 1 km to 25 km.

Multiple small cell base stations 1 are installed in the cell of the base station 2 (macro cell), and the cells of the small cell base stations 1 (small cells) and the cell of the base station 2 overlap each other. Each small cell base station 1 can serve as a base station of a user plane (U-Plane) for transmitting user data, and the macro cell base station 2 can serve as a base station of a control plane (C-Plane) for transmitting control signals.

A user terminal 3 may be a smartphone, a tablet terminal, a wearable terminal, a PC and other types of terminals, and is capable of communicating with other small cell base stations 1 and the macro cell base station 2.

The controller 4 includes an MME (Mobility Management Entity) which functions as an access gateway for the control plane for handling network control, an S-GW (Serving Gateway) functions as a gateway configured to handle a user plane of user data, and an RNC (Radio Network Controller) which manages transmission and reception of signals and controls line connection and handover; that is, functions as an host node of the macro cell base station 2, which means the macro cell base station 2 connects to the Internet via the controller 4.

Figure 2:
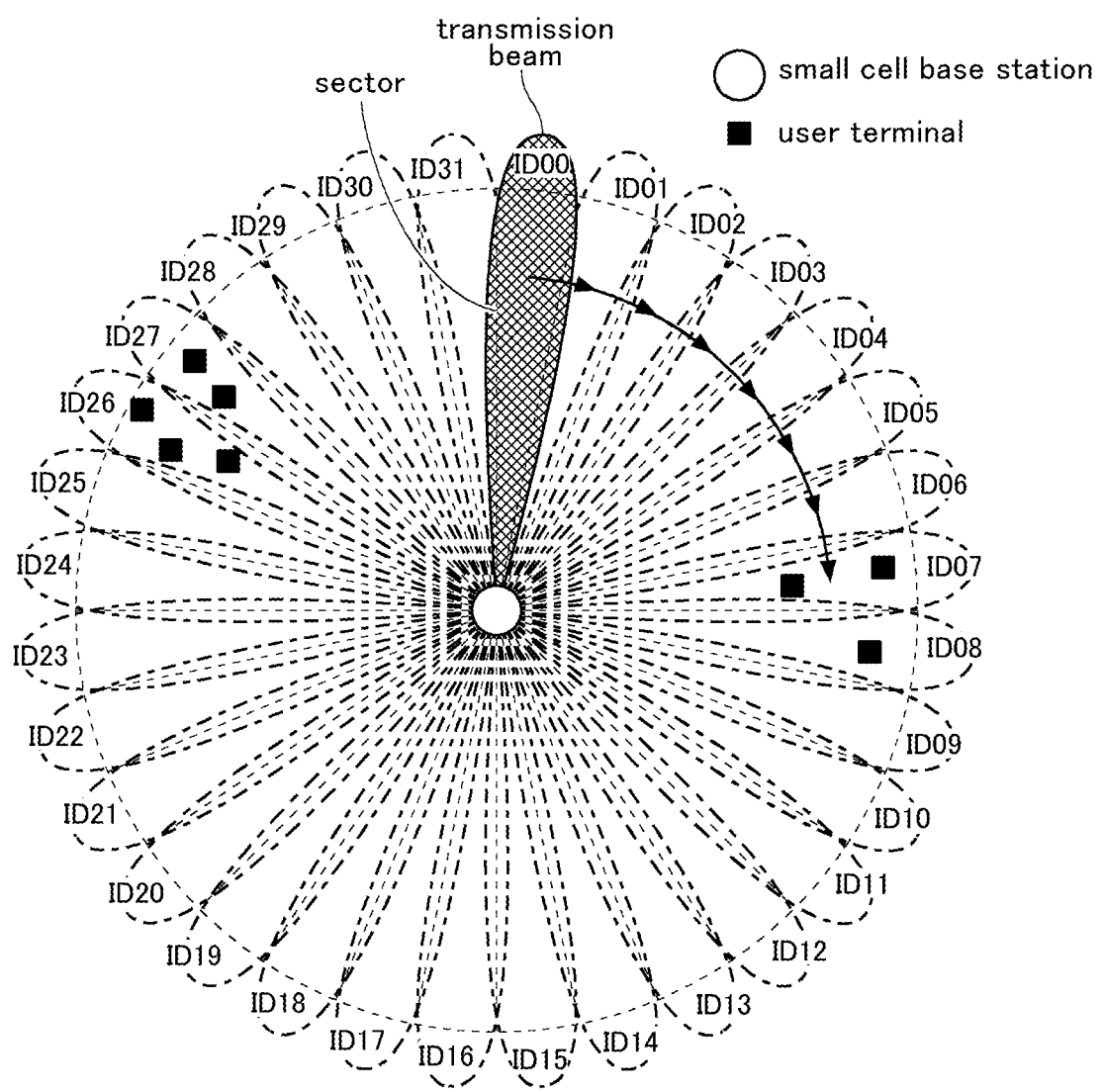
FIG. 2 is an explanatory view showing a situation of how beam control is performed at a small cell base station 1.

Next, beam control performed in each small cell base station 1 will be described. FIG. 2 is an explanatory view showing a situation of how beam control is performed at a small cell base station 1.

When a user terminal 3 communicates with a small cell base station 1, the user terminal 3 conducts a cell search for the present cell (communication area) in which the user terminal 3 is present in order to establish synchronization. During a cell search, the user terminal receives a down signal (control signal) for synchronization (hereinafter "synchronization down signal") transmitted from the small cell base station 1 at fixed intervals, and, based on the synchronization down signal, captures a synchronization channel to achieve frequency synchronization and timing synchronization to thereby determine the current cell. Then, the user terminal 3 transmits an up signal for synchronization (hereinafter "synchronization up signal") (RACH preamble) to the small cell base station 1 in order to notify the small cell base station 1 of the presence of the user terminal 3 to thereby reserve a communication resource and start to transmit and receive user data.

In the present embodiment, the small cell base station 1 is configured to perform beam forming; that is, to transmit a synchronization down signal as a directional transmission beam, thereby enabling an increase in the reachable distance of the synchronization down signal. The synchronization down signal needs to be receivable by all the user terminals 3 present in the cell. Thus, the small cell base station is configured to time-divisionally transmit the synchronization down signal concurrently with changing its transmission beam direction.

As shown in FIG. 2, in one embodiment, the small cell base station is configured to form transmission beams so as to make a rotation of the beam direction, that is, to sequentially form transmission beams one by one concurrently with shifting the beam angle by a prescribed angle each from the other. In the embodiment shown in FIG. 2, the transmission beams having the respective beam IDs ID00 to ID31 are sequentially formed one by one.

In this way, when the cell is divided into fan-shaped sectors formed around the small cell base station 1 each having a fixed angle, the small cell base station can transmit a synchronization down signal to user terminals 3 present in the respective fan-shaped sectors by changing the transmission beam direction in a stepwise manner. Thus, when the formation of the transmission beams makes one rotation, the synchronization down signal can be transmitted to all the user terminals 3 present in the cell of the small cell base station 1.

However, the user terminals 3 are not uniformly present within the cell of the small cell base station 1, and there are some sectors in which one or more user terminals 3 are present and the other sectors in which the user terminals 3 are not present. This means that a transmission beam which is directed to a sector in which no user terminal 3 is present will be not utilized and wasted.

Figure 3:
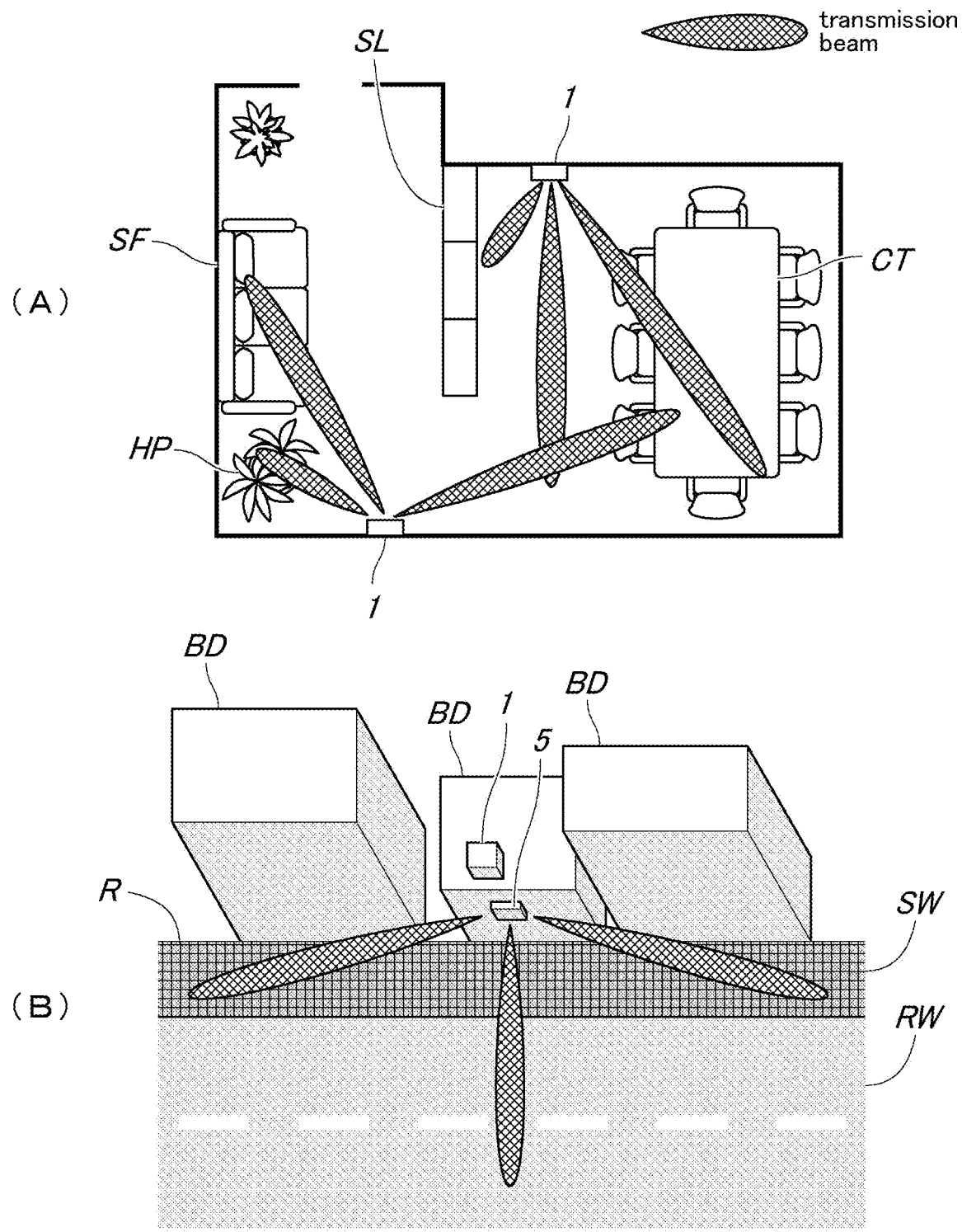
FIG. 3 is an explanatory view showing examples of installation of the small cell base station(s) 1.

Next, installation of the small cell base station 1 will be described. FIG. 3 is an explanatory view showing examples of installation of the small cell base station(s) 1.

In the example shown in FIG. 3A, small cell base stations 1 are installed on a wall surface of a conference room. A conference table CT, bookshelves SL, a sofa SF and foliage plants HP are disposed in the conference room. In this case, a person carrying the user terminal 3 tends to stay near the conference table CT and the sofa SF, and not stay around the bookshelves SL and the foliage plants HP. Therefore, among the transmission beams transmitted from the small cell base station 1, the transmission beams in the directions to the conference table CT or the sofa SF are frequently used by the user terminals 3, while the transmission beams in the directions to the bookshelves SL and the foliage plants HP are rarely used by the user terminals 3.

In the example shown in FIG. 3B, the small cell base station 1 is installed in a building BD located on one side of the road R, and the multi-element antenna 5 is installed on a wall surface of the building BD. Since a person carrying the user terminal 3 walks along the sidewalk SW, user terminals 3 are located on the sidewalk SW in most cases. Therefore, among the transmission beams transmitted from the small cell base station 1, the transmission beams in the direction towards the sidewalk SW are frequently used by the user terminals 3, while the transmission beams in the direction towards the road RW are rarely used by the user terminals 3.

In this way, the user terminals 3 are not present uniformly around a small cell base station 1, and regions in which many user terminals 3 are frequently present and those in which the user terminals 3 are rarely present are formed depending on the installation location of the small cell base station 1. That is, in most cases, the user terminals 3 are unevenly distributed around the small cell base station. As a result, the utilization rates of different transmission beams formed around the small cell base station 1 vary greatly depending on their transmission beam directions. Generally, the regions where the user terminals 3 tend to be present do not change frequently and thus the utilization rates of the respective transmission beams also do not change frequently.

In view of such situations, in the present embodiment, after checking the utilization rates of the different transmission beam directions over a prescribed time period, transmission frequencies are set for the transmission beams such that transmission beams with higher transmission frequencies are formed in beam directions towards where the transmission beams are frequently utilized; that is, where the user terminals 3 are frequently present, and transmission beams with lower transmission frequencies are formed in beam directions towards where the transmission beams are not frequently utilized; that is, where the user terminals 3 are not frequently present.

In the example shown in FIG. 3A, transmission frequencies of transmission beam are set such that the transmission beams with higher transmission frequencies are formed in the beam directions towards the conference table CT and the sofa SF, whereas transmission beams with lower transmission frequencies are formed in the beam directions towards the bookshelves SL and foliage plants HP.

Figure 4:
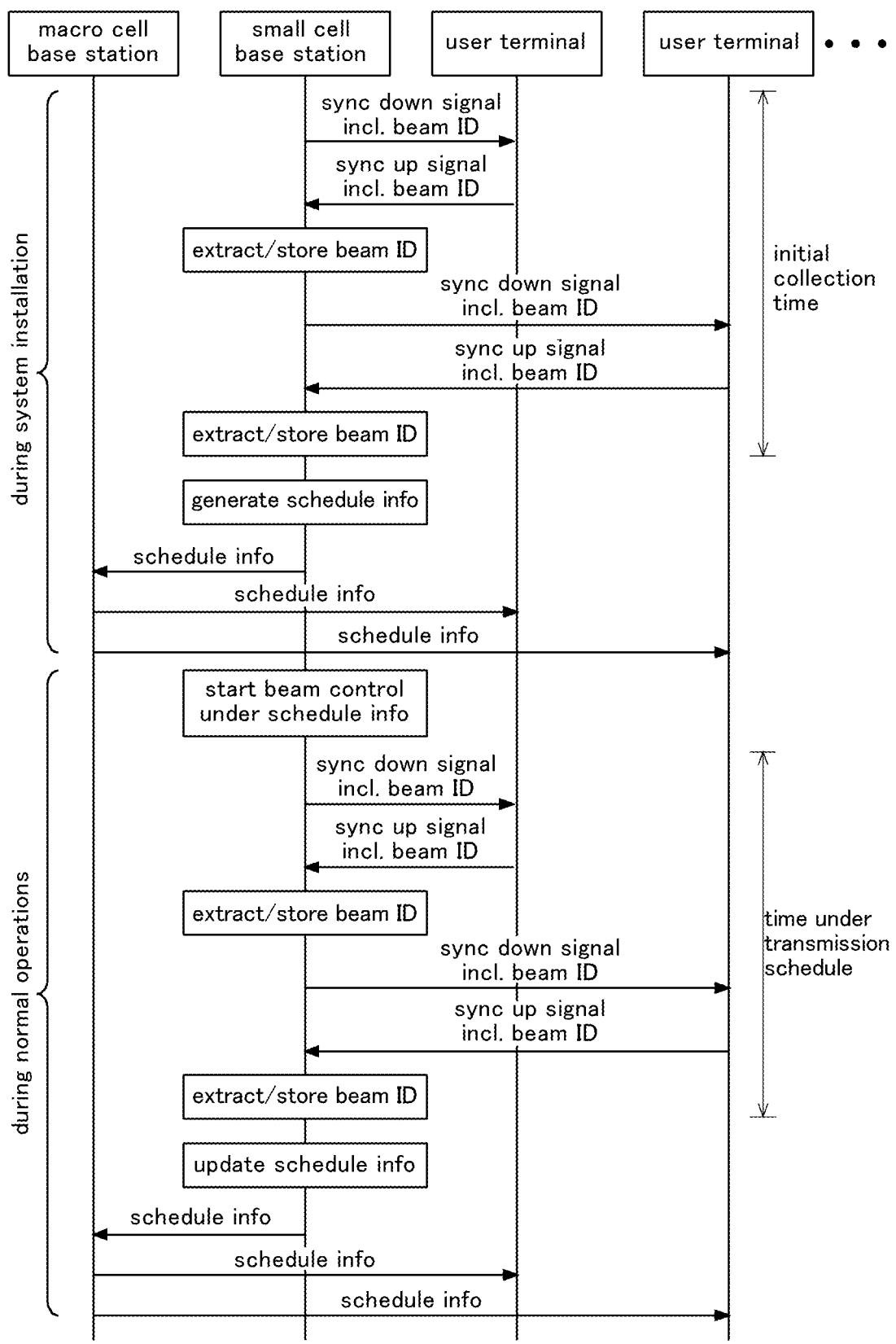
FIG. 4 is a sequence diagram showing an outline of operations of the small cell base station 1, a macro cell base station 2 and user terminals 3.

Next, an outline of operations of a small cell base station 1, a macro cell base station 2 and a user terminal 3 will be described. FIG. 4 is a sequence diagram showing an outline of operations of a small cell base station 1, a macro cell base station 2 and user terminals 3.

In the present embodiment, first, a synchronization down signal including its beam ID, which identifies a transmission beam used for transmission of the synchronization down signal, is transmitted from the small cell base station 1 to a user terminal 3. Upon receiving the synchronization down signal, the user terminal 3 extracts the beam ID from the synchronization down signal and transmits a synchronization up signal (RACH preamble) including the beam ID to the small cell base station 1. Upon receiving a synchronization up signal, the small cell base station 1 extracts the beam ID from the synchronization up signal and stores the beam ID.

As described above, in the present embodiment, synchronization up and down signals both including the beam ID are transmitted and received between the user terminal 3 and the small cell base station 1. Thus, since a user terminal(s) 3 present in a sector in each transmission beam direction can receive a synchronization down signal including a corresponding beam ID, the beam ID extracted from a synchronization up signal at the small cell base station 1 corresponds to the sector in which the user terminal(s) 3 is present. In this way, beam IDs are fed back from user terminals 3 to a small cell base station 1, allowing the small cell base station 1 to efficiently collect historical information on the sectors in which one or more user terminals 3 are present.

In addition, in the present embodiment, when the historical information on sectors where at least one user terminal 3 is present is collected, the small cell base station 1 generates transmission schedule information, which specifies transmission timing of transmission beams for the respective sectors, based on the historical information, and the small cell base station 1 performs, based on the transmission schedule information, beam control for controlling transmission beams when transmitting a synchronization down signal.

Furthermore, in the present embodiment, in an initial collection period (learning phase) during system installation, the small cell base station collects historical information on the sectors where at least one user terminal 3 is present by transmission and reception of down and up signals including the beam IDs and generates initial transmission schedule information based on the historical information. In this initial collection period, the formation of the transmission beams makes one rotation; that is, the transmission beams of all beam IDs are transmitted. As a result, the small cell base station can grasp the presence and absence of the user terminals 3 in every sector.

During normal operations, the small cell base station performs beam control based on transmission schedule information, and in performing beam control, the small cell base station collects historical information on each sector where at least one user terminal 3 is present by transmission and reception of down and up signals including the beam ID and update the transmission schedule information based on the historical information. The transmission schedule information is updated every cycle of the transmission schedule.

In the present embodiment, after generating transmission schedule information, the small cell base station 1 notifies the user terminals 3 of the generated transmission schedule information via the macro cell base station 2. A user terminal 3 controls, based on the transmission schedule information, timing of observation of down signals transmitted from the small cell base station 1. It should be noted that the notification of the transmission schedule information is performed to allow user terminals 3 to more efficiently receive synchronization down signals, and is not essential.

Next, historical information collected by a small cell base station 1 will be described. FIG. 5 is an explanatory view showing an example of historical information collected by a small cell base station 1. FIG. 6 is an explanatory view showing examples of situations of how user terminals 3 are present in some sectors.

In the present embodiment, synchronization down and up signals including the beam IDs are transmitted and received between a small cell base station 1 and user terminals 3 so that the beam IDs are fed back from the user terminals 3 to the small cell base station 1, allowing the small cell base station 1 to grasp presence or absence of at least on user terminal 3 in every sector for a corresponding each ID. Thus, during one scan in which the formation of the transmission beams makes one rotation, the small cell base station 1 cab grasp presence or absence of at least on user terminal 3 in each of the sectors for corresponding all the IDs.

In the case of the example shown in FIG. 5, in the first scan (#1), the user terminals 3 are present in the sectors corresponding to the beam IDs: ID 07, ID 08, ID 26, and ID 27 as shown in FIG. 6A. In the second scan (#2), the user terminals 3 are present in the sectors corresponding to the beam IDs: ID 07 to ID 09, ID 18, ID 25 to ID 28, as shown FIG. 6B. In the third scan (#3), the user terminals 3 are present in the sectors corresponding to the beam IDs: ID 05, ID 07, ID 08, ID 18, and ID 26 as shown in FIG. 6C.

In the present embodiment, such scanning is repeated as many times as required, and in each scan, historical information on the beam IDs in which the user terminal 3 are present is collected. Then, for each beam ID, the number of times of presence of at least one user terminal 3 in multiple scans is determined, and for each beam ID, the user presence ratio, i.e., the ratio of the number of times of presence of at least one user terminal 3 to the total number of scans, is determined. This user presence ratio is presence frequency information representing the frequency of presence of at least one user terminal 3 in a sector for each beam ID. Based on the presence frequency information, the small cell base station can grasp how frequent the user terminals 3 are present in each sector for a corresponding beam ID.

Next, transmission schedule information generated by a small cell base station 1 will be described. FIG. 7 is an explanatory diagram showing an example of transmission schedule information generated by a small cell base station 1. It should be noted that FIG. 7 shows one cycle of the transmission schedule.

Transmission schedule information specifies transmission timing of the transmission beam of a synchronization down signal for each beam ID. In the transmission schedule information, multiple scans are performed over the entire cell during one cycle (unit period) of the transmission schedule. In the example shown in FIG. 7, multiple scans are performed from the first scan (#1) to the Nth scan (# N) in one cycle of the transmission schedule, and during normal operations, the cycle of the transmission schedule is repeated.

Furthermore, the transmission schedule information is set such that, in each of the scans (#1) to (# N−1), the transmission beams corresponding to the beam IDs determined by eliminating some beam IDs from all the beam IDs are transmitted; that is, the transmission beams with some beam IDs are not transmitted and only the transmission beams with the other beam IDs are transmitted in each scan, and that, in the last scan (# N), all the transmission beams corresponding to all the beam IDs are transmitted.

It should be noted that the transmission beams for all the beam IDs must be transmitted in at least one scan among all the scans in one cycle of in the transmission schedule, and the transmission of all the transmission beams may not be limited to the last scan as shown in FIG. 7.

The transmission schedule information is generated based on presence frequency information (the user presence ratios in FIG. 5) provided from historical information collected in past multiple scans; that is, based on information on a frequency of presence of at least one user terminal 3 in a sector for each ID, and the transmission schedule information contains frequencies of transmission of the transmission beams determined for the respective beam IDs according to the frequencies of presence of at least one user terminal 3 in the respective sectors. Specifically, for a sector in which at least one user terminal 3 is present highly frequently, the transmission beams are transmitted with a higher frequency of transmission; that is, the transmission beams is transmitted at shorter intervals, whereas, for a sector in which at least one user terminal 3 is present less frequently, the transmission beams are transmitted with a lower frequency of transmission; that is, the transmission beams is transmitted at longer intervals.

For example, for a beam ID of a sector with a user presence ratio (the ratio of the number of presence of at least one user terminal 3 to the total number of scans) of 100%, the transmission beam is transmitted in every scan, whereas, for a beam ID of a sector with a user presence ratio of 50%, the transmission beam is transmitted once in every two scans.

Figure 8:
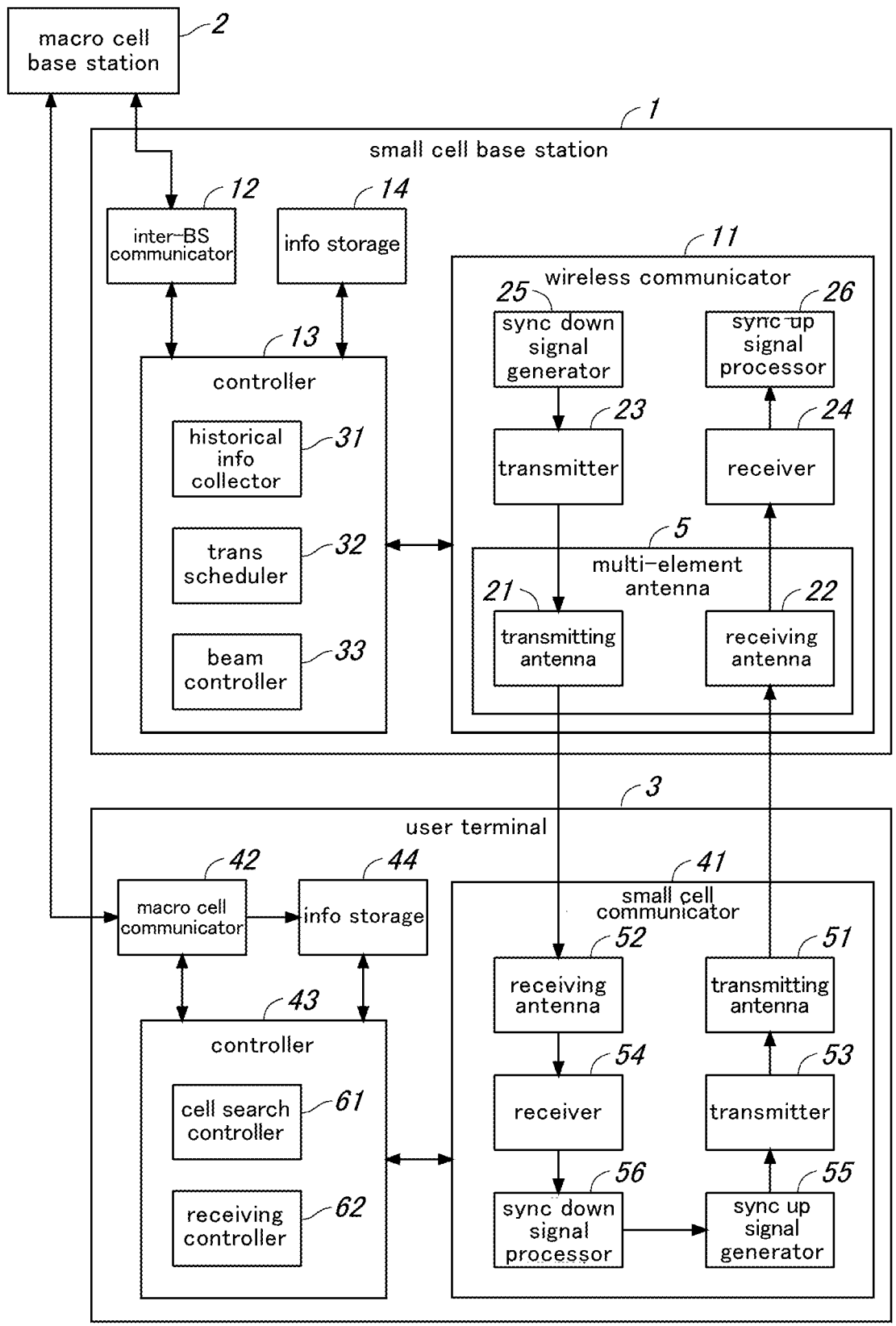
FIG. 8 is a block diagram showing a schematic configuration of a small cell base station 1 and a user terminal 3.

Next, a schematic configuration of a small cell base station 1 and a user terminal 3 will be described. FIG. 8 is a block diagram showing a schematic configuration of a small cell base station 1 and a user terminal 3.

The small cell base station 1 includes a wireless communicator 11, an inter-base-station communicator 12, a controller 13, and an information storage 14.

The inter-base-station communicator 12 communicates with the macro cell base station 2. In the present embodiment, the transmission schedule information is transmitted from the inter-base-station communicator 12 to the macro cell base station 2. Also, the inter-base-station communicator 12 receives auxiliary information transmitted from the macro cell base station 2.

The information storage 14 stores historical information, transmission schedule information, programs executable by the controller 13, and other information.

The wireless communicator 11 includes a transmitting antenna 21, a receiving antenna 22, a transmitter 23, a receiver 24, a synchronization down signal generator 25, and a synchronization up signal generator 26. The transmitting antenna 21 and the receiving antenna 22 are multi-element antennas 5.

The synchronization down signal generator 25 generates a synchronization down signal including a beam ID. The transmitting antenna 21 and the transmitter 23 are used to transmit a synchronization down signal, which is generated by the synchronization down signal generator 25, to one or more user terminals 3. The receiving antenna 22 and the receiver 24 are used to receive a synchronization up signal (RACH preamble) transmitted from one or more user terminals 3. The synchronization up signal generator 26 performs a signal processing operation on a synchronization up signal (RACH preamble) received by the receiving antenna 22 and the receiver 24. In the present embodiment, a beam ID is extracted from a synchronization up signal.

The controller 13 includes a historical information collector 31, a transmission scheduler 32, and a beam controller 33. The controller 13 is implemented by a processor, and each part of the controller 13 is implemented by causing the processor to execute a program stored in the information storage 14.

The historical information collector 31 stores beam IDs, which are extracted from synchronization up signals by the synchronization up signal generator 26, in the information storage 14 as historical information.

The transmission scheduler 32 generates transmission schedule information (see FIG. 7) based on the historical information (see FIG. 5) stored in the information storage 14. The transmission schedule information specifies presence or absence of transmission for each beam ID in each scan of one cycle of the transmission schedule.

The beam controller 33 performs beam control (beam forming), controlling formation of transmission beams used to transmit synchronization down signals based on the transmission schedule information generated by the transmission scheduler 32. Specifically, the beam controller generates a BF weight (beam forming weight) for forming a transmission beam with a beam ID, which is specified to perform transmission of a synchronization down signal in the transmission schedule information.

Moreover, the beam controller 33 performs beam control based on the auxiliary information (beam width, switching interval, or other information) provided from the macro cell base station 2. In some cases, auxiliary information may not be notified from the macro cell base station 2, but be held by the small cell base station 1 itself as a system parameter.

The user terminal 3 includes a small cell communicator 41, a macro cell communicator 42, a controller 43, and an information storage 44.

The macro cell communicator 42 communicates with the macro cell base station 2. In the present embodiment, the macro cell communicator 42 receives auxiliary information and transmission schedule information transmitted from the macro cell base station 2.

The information storage 44 stores auxiliary information, transmission schedule information, programs executable by the controller 43, and other information.

The small cell communicator 41 communicates with the small cell base station 1 and includes a transmitting antenna 51, a receiving antenna 52, a transmitter 53, a receiver 54, a synchronization up signal generator 55, and a synchronization down signal processor 56.

The receiving antenna 52 and the receiver 54 are used to receive synchronization down signals transmitted from the small cell base station 1.

The synchronization down signal processor 56 performs a signal processing operation on the synchronization down signals received by the receiving antenna 52 and the receiver 54. More specifically, the synchronization processing operation is performed by detecting the frame timing of the synchronization down signals. From each synchronization down signal, the synchronization down signal processor also extracts a cell ID (the ID of a small cell base station 1 from which the synchronization down signal is transmitted) and a beam ID (the ID for a synchronization down signal from the small cell base station 1). In addition, the synchronization down signal processor 56 measures the received power of the synchronization down signal.

The synchronization up signal generator 55 generates a synchronization up signal (RACH preamble) including a beam ID extracted by the synchronization down signal processor 56. Then, a sequence of RACH preambles is generated from both the cell ID and the beam ID, or from only the beam ID. In addition, the synchronization up signal generator determines the transmission power of a synchronization up signal based on the received power of the synchronization down signal.

The transmitting antenna 51 and the transmitter 53 are used to transmit the synchronization up signal (RACH preamble), which is generated by the synchronization up signal generator 55, to the small cell base station 1.

The controller 43 includes a cell search controller 61 and a receiving controller 62. The controller 43 is implemented by a processor, and each part of the controller 43 is implemented by causing the processor to execute a program stored in the information storage 44.

The cell search controller 61 performs control of a cell search for an optimum small cell base station 1 to be connected, and notifies the synchronization up signal generator 55 and the synchronization down signal processor 56 of control information required for the cell search.

The receiving controller 62 controls, by using the receiving antenna 52 and the receiver 54, timing of observation of synchronization down signals transmitted from the small cell base station 1 based on the transmission schedule information provided from the small cell base station 1 via the macro cell base station 2. Specifically, the receiving controller sets the receiving antenna 52 and the receiver 54 to a signal observation state at the timing when the transmission beam in which the user terminal itself is present for the synchronization down signal is transmitted from the small cell base station 1. This prevents the receiving antenna 52 and the receiver 54 from performing unnecessary receiving operations, enabling the user terminals to efficiently receive synchronization down signals from the small cell base station 1.

Figure 9:
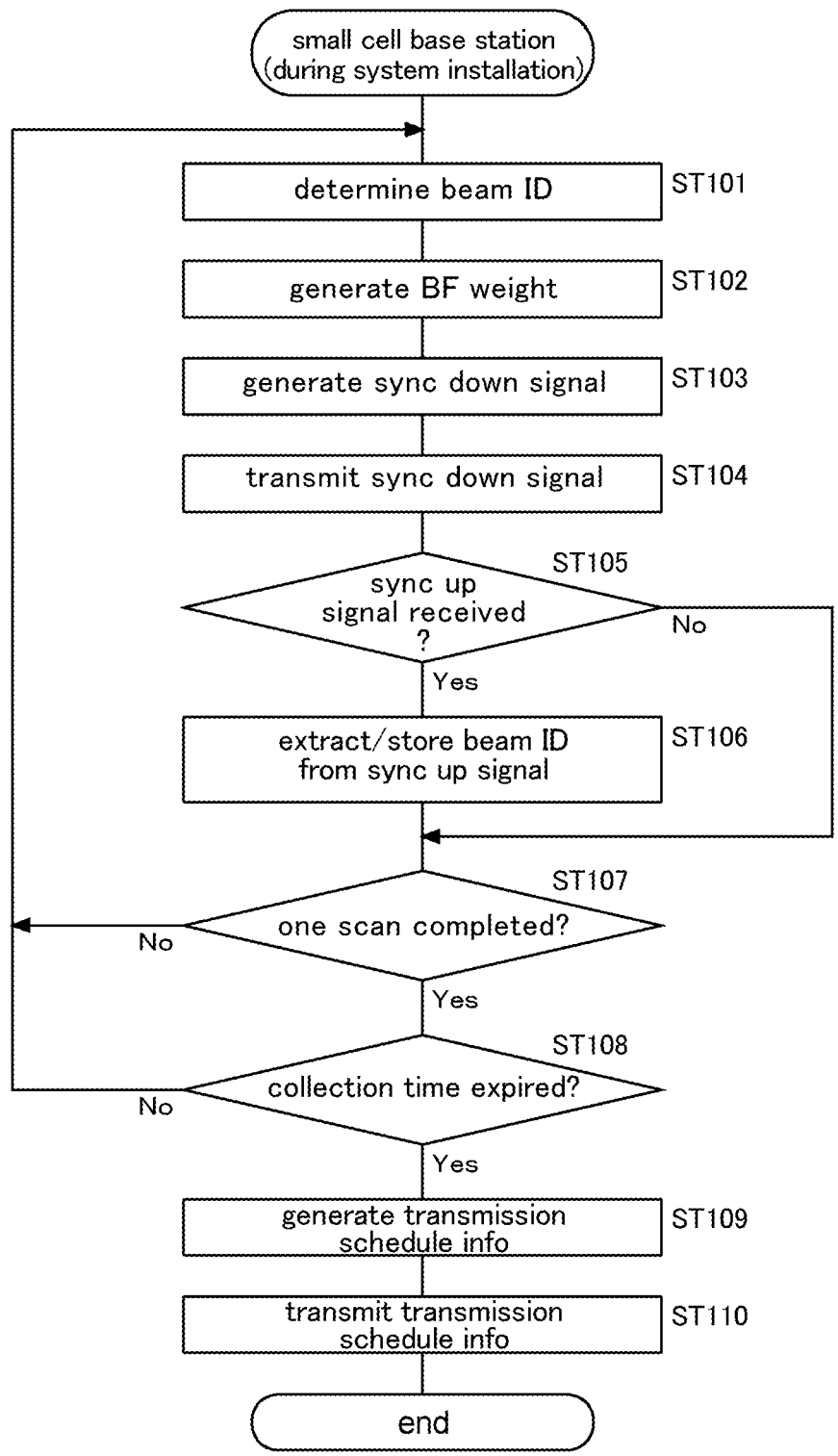
FIG. 9 is a flow chart showing an operation procedure of a small cell base station 1 during system installation.

Next, operations of a small cell base station 1 during system installation will be described. FIG. 9 is a flow chart showing an operation procedure of a small cell base station 1 during system installation.

In a small cell base station 1 during system installation, a beam controller 33 first determines a beam ID to be used this time for transmission of a synchronization down signal (ST 101). When starting a scan, the beam controller selects the first beam ID (ID00). Next, the beam controller generates a BF weight based on the determined beam ID (ST 102). Next, a synchronization down signal generator 25 generates a synchronization down signal including the beam ID (ST 103). Then, a transmitting antenna 21 and a transmitter 23 are used to transmit the synchronization down signal to one or more user terminals 3 (ST 104).

Next, when the synchronization up signal transmitted from the user terminal 3 is received by using a receiving antenna 22 and a receiver 24 (Yes at ST 105), a synchronization up signal generator 26 extracts the beam ID included in the synchronization up signal, and a historical information collector 31 stores the beam ID as historical information in an information storage 14 (ST 106). Then, the beam controller 33 determines whether or not one scan has completed; that is, whether or not transmission of all transmission beams for all the beam IDs has completed (ST 107).

Then, when one scan has not completed (No at ST 107), the beam controller selects the next beam ID (ST 101), and the operations (ST 102 to ST 106) are repeated for the next beam ID.

Then, when one scan is completed (Yes at ST 107), the small cell base station determines whether or not a prescribed collection period (for example, one week) has elapsed (ST 108). When the prescribed collection period has not elapsed (No at ST 108), the process proceeds to perform the next scan and the first beam ID is selected (ST 101), and the operations (ST 102 to 106) are repeated for the beam ID.

When the prescribed collection period has elapsed (Yes at ST 108), a transmission scheduler 32 generates transmission schedule information based on the historical information stored in the information storage 14 (ST 109). Next, an inter-base-station communicator 12 transmits the transmission schedule information to a macro cell base station 2 (ST 110).

Figure 10:
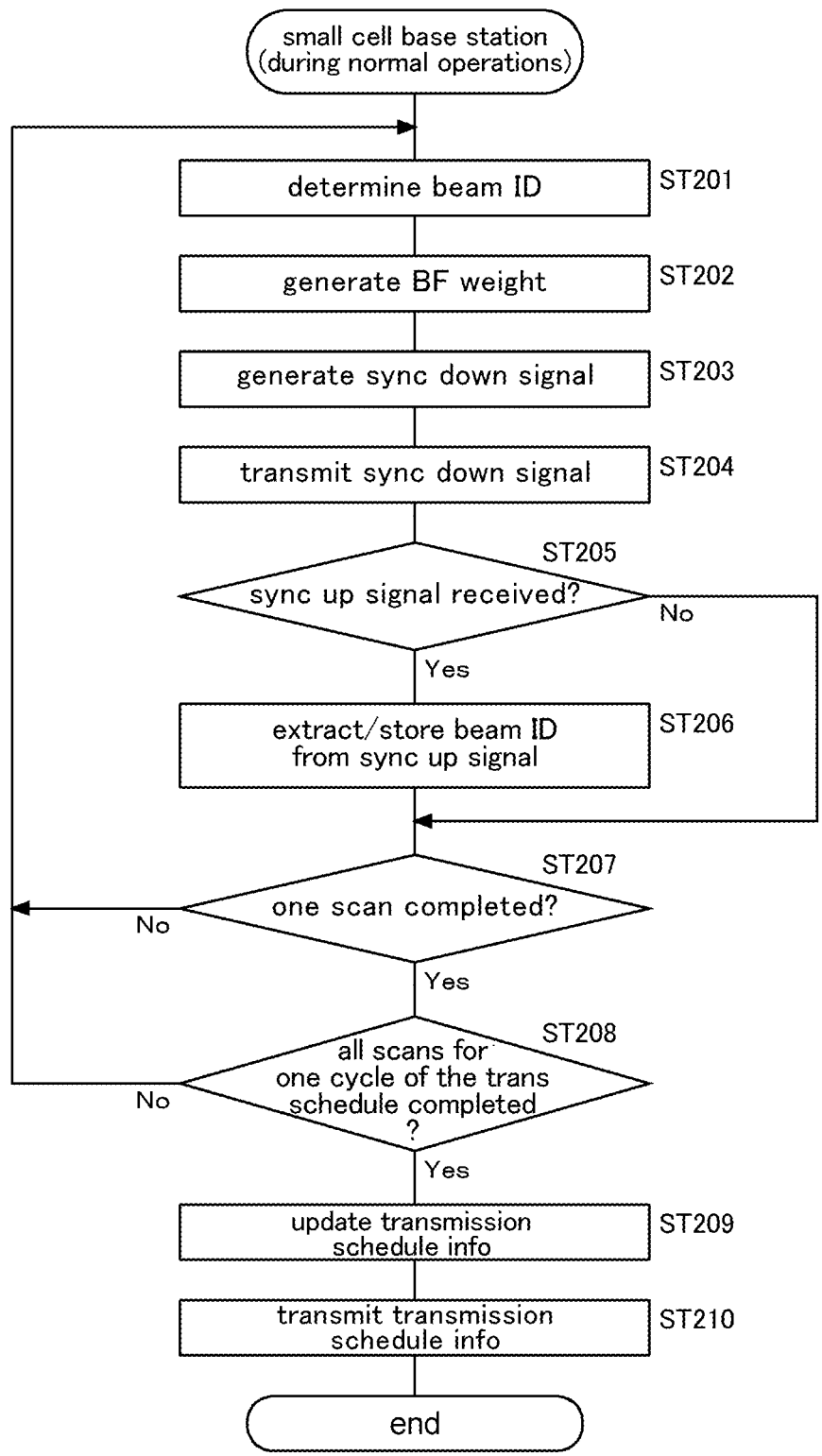
FIG. 10 is a flowchart showing an operation procedure during normal operations of a small cell base station 1.

Next, operations of a small cell base station 1 during normal operations will be described. FIG. 10 is a flowchart showing an operation procedure during normal operations of a small cell base station 1.

In a small cell base station 1 during normal operations, the beam controller 33 first determines a beam ID to be used this time for transmission of a synchronization down signal based on the transmission schedule information (ST 201). When starting the transmission schedule, the beam controller selects the first beam ID of the first scan of the transmission schedule. Next, the beam controller generates a BF weight based on the determined beam ID (ST 202). Next, a synchronization down signal generator 25 generates a synchronization down signal including the beam ID (ST 203). Then, a transmitting antenna 21 and a transmitter 23 are used to transmit the synchronization down signal to one or more user terminal 3 (ST 204).

Next, when the synchronization up signal transmitted from the user terminal 3 is received by using a receiving antenna 22 and a receiver 24 (Yes at ST 205), a synchronization up signal generator 26 extracts the beam ID included in the synchronization up signal, and a historical information collector 31 stores the beam ID as historical information in the information storage 14 (ST 206). Then, a beam controller 33 determines whether or not one scan has completed; that is, whether or not transmission of all transmission beams for all the beam IDs has completed (ST 207).

Then, when one scan has not completed (No at ST 207), the beam controller selects the next beam ID (ST 201), and the operations (ST 202 to ST 206) are repeated for the next beam ID.

Then, when one scan is completed (Yes at ST 207), the small cell base station determines whether or not all scans for one cycle of the transmission schedule have completed (ST 208). When all the scans have not completed (No at ST 208), the process proceeds to perform the next scan and the specified beam ID for the next scan is selected (ST 101), and the operations (ST 102 to 106) are repeated for the beam ID.

When all the scans for one cycle of the transmission schedule have completed (Yes at ST 208), a transmission scheduler 32 updates the transmission schedule information based on the historical information stored in the information storage 14 (ST 209). Next, the inter-base-station communicator 12 transmits the transmission schedule information to the macro cell base station 2 (ST 210).

Figure 11:
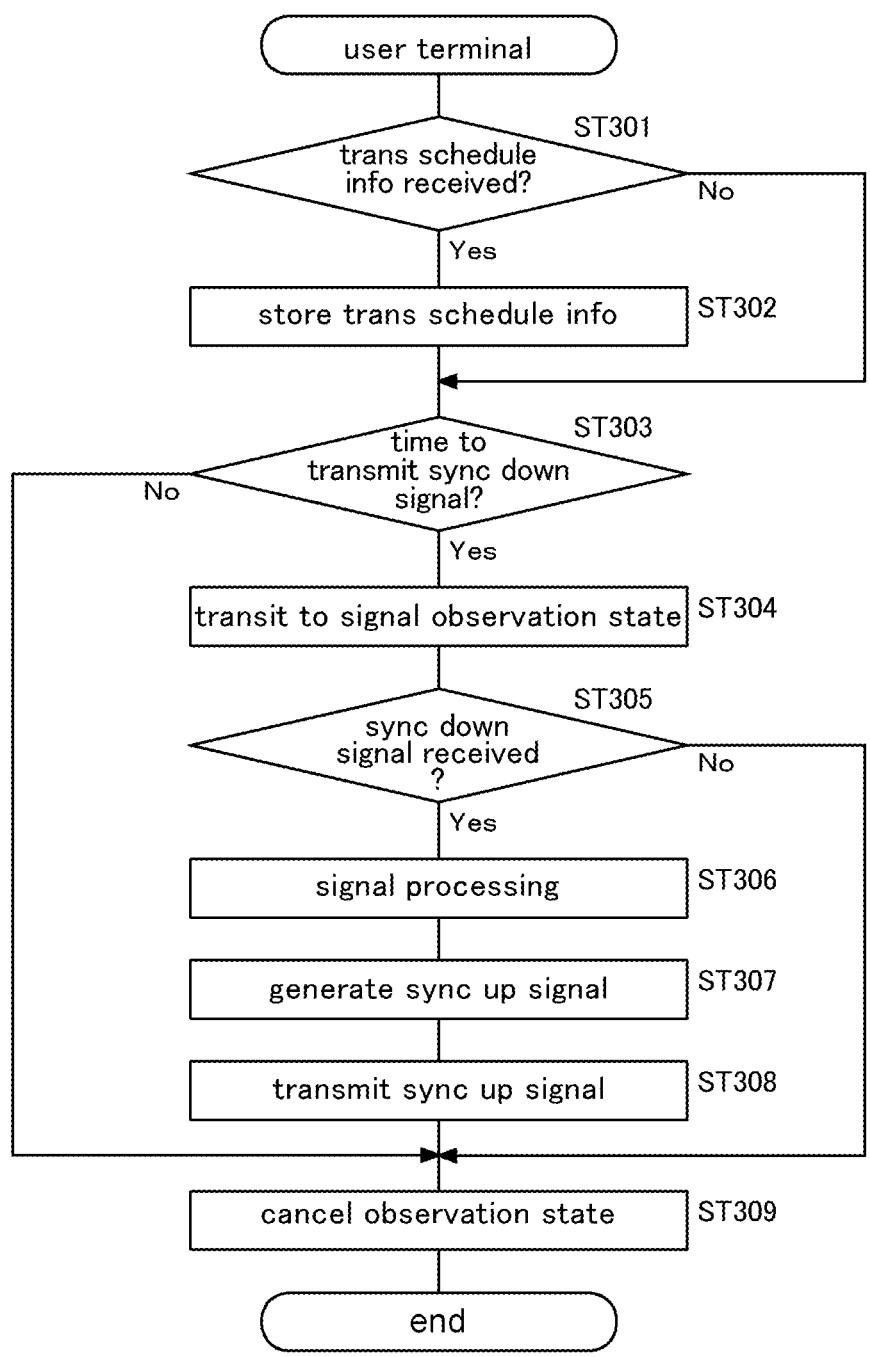
FIG. 11 is a flowchart showing an operation procedure of a user terminal 3.

Next, operations of a user terminal 3 will be described. FIG. 11 is a flowchart showing an operation procedure of a user terminal 3.

Firstly, in the user terminal 3, when a macro cell communicator 42 receives transmission schedule information transmitted from the macro cell base station 2 (Yes in ST 301), the transmission schedule information is stored in the information storage 44 (ST 302).

Next, a receiving controller 62 determines whether or not it is the timing at which a synchronization down signal is to be transmitted based on the transmission schedule information (ST 303). If it is the timing at which a synchronization down signal is to be transmitted (Yes at ST 303), the receiving antenna 52 and the receiver 54 are shifted to a signal observation state (ST 304).

When a synchronization down signal is received by the receiving antenna 52 and the receiver 54 (Yes at ST 305), a synchronization down signal processor 56 extracts a beam ID from the synchronization down signal (ST 306). Next, a synchronization up signal generator 55 generates a synchronization up signal including a beam ID (ST 307). Next, a transmitting antenna 51 and a transmitter 53 are used to transmit the synchronization up signal to the small cell base station 1 (ST 308). Then, the signal observation state of the receiving antenna 52 and the receiver 54 is canceled (ST 309).

In this way, in the present embodiment, a synchronization down signal is transmitted to user terminals 3 present in respective sectors in the cell concurrently with eliminating transmission of transmission beams to sectors in which the user terminals 3 are present less frequently, which can reduce unnecessary transmission of the transmission beams in directions towards where the user terminals 3 are not present, thereby shortening a waiting time until the user terminals 3 receive the synchronization down signal to thereby improve throughput. In addition, since unnecessary transmission beams, which are to be eliminated, are determined based on historical information, it is ensured that the transmission beams are transmitted in directions towards where the user terminals 3 are present.

Furthermore, in the present embodiment, multiple scans are performed over an entirety of the cell during one cycle of a transmission schedule concurrently with eliminating transmission of some transmission beams in each scan, which reduces the number of transmission beams in each scan to thereby shorten the time required for one scan. This shortens time intervals at which each user terminal 3 present in a sector receives the synchronization down signal and reduces the number of user terminals 3 waiting for the down signal in the same sector, thereby lowering a probability that multiple user terminals 3 in a single sector transmit synchronization up signals in a synchronized manner, and thus reducing interferences between different synchronization up signals.

In order to further reduce interferences between different synchronization up signals, a timing offset may be added to transmission timing of the synchronization up signals so as to shift the transmission times of user terminals 3 present in the same sector. For example, the user terminal 3 may be configured to generate a random value so that a timing offset determined based on the generated random value can be added to the transmission timing. Alternatively, a timing offset determined based on the received power of the synchronization down signal may be added to the transmission timing. In this case, it is preferable that timing offsets to be added to the transmission times are determined so that the user terminals 3 sequentially perform transmissions in descending order of the received power.

In some cases, timing offsets to be added may be determined based on the beam ID so as to avoid the collision between two adjacent transmission beams.

Modification of First Embodiment

Figure 12:
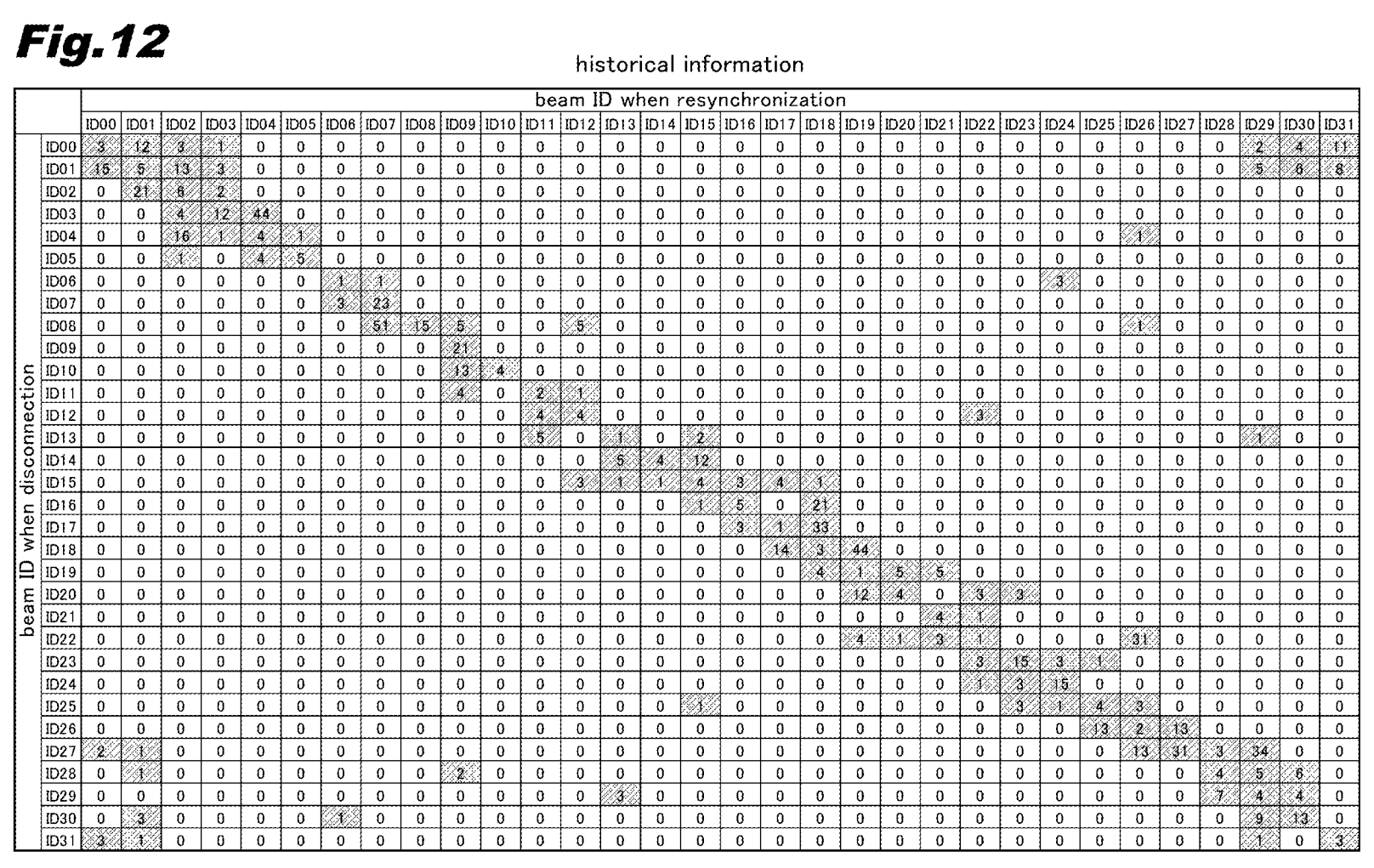

Next, a modification of the first embodiment of the present invention will be described. FIG. 12 is an explanatory view showing an example of historical information according to a modification of the first embodiment of the present invention. Except for what will be discussed here, the configuration of the present embodiment is the same as that of the first embodiment.

In cases where a moving obstacle exists, when the obstacle moves into a radio wave propagation path between a small cell base station 1 and a user terminal 3, communication is disconnected between the user terminal and the small cell station, and when the obstacle moves past the radio wave propagation path, the communication can be restored. When a person carrying a user terminal 3 moves so that the user terminal 3 moves into an area where radio wave paths are blocked by an obstacle, communication is disconnected between the user terminal and the small cell base station 1, and when the user terminal 3 leaves the area where radio wave paths are blocked by the obstacle, the communication can be restored.

After communication is temporarily disconnected in this way, processing operation to establish re-synchronization is performed in order to restore the communication. In the modification of the first embodiment, transmission schedule control is performed so as to shorten the time required to establish re-synchronization.

In the modification of the first embodiment of the present invention, transmission schedule information is generated based on the historical information shown in FIG. 12. The historical information represents correlations between beam IDs at the time of disconnection and beam IDs at the time of establishment of resynchronization (at the time of reconnection) in the past record. Specifically, the historical information represents the number of successful resynchronization for each combination of beam ID at the time of disconnection and beam ID at the time of establishment of resynchronization, and the larger the number of successful resynchronization is, the higher a correlation between beam ID at the time of disconnection and beam ID at the time of establishment of resynchronization is.

More specifically, when communication is disconnected due to the movement of an obstacle without the movement of a user terminal 3, the user terminal 3 is present in the same sector both at the time of disconnection and at the time of establishment of resynchronization, and thus the beam ID at the time of disconnection is identical with the beam ID at the time of establishment of resynchronization. In cases where an obstacle is stationary and communication is disconnected due to the movement of a person carrying a user terminal 3, communication is disconnected when the user terminal 3 is present in a sector located on one side of the obstacle where radio waves are blocked by the obstacle, and resynchronization is established when the user terminal 3 is present in a sector located on the other side of the obstacle where radio waves are not blocked by the obstacle, resynchronization is established. In this case, a correlation exists between beam ID at the time of disconnection and beam ID at the time of establishment of resynchronization, depending on the location of the obstacle and the situation of an area in which the person carrying a user terminal 3 can move. In this way, there exists a combination of beam ID at the time of disconnection and beam ID at the time of establishment of resynchronization which combination provides a higher correlation therebetween.

Thus, in the modification of the first embodiment, the small cell base station 1 generates basic transmission schedule information (see FIG. 7) based on the presence frequency information on the frequency of presence of at least one user terminal 3 for each beam ID (the user presence ratio in FIG. 5), and then corrects the generated transmission schedule information based on historical information shown in FIG. 12. Specifically, when there exists a user terminal 3 which was disconnected from a small cell base station, the small cell base station acquires, based on the historical information shown in FIG. 12, a beam ID for establishment of resynchronization having a high correlation with the beam ID at the time of disconnection, and then the small cell base station transmits the transmission beam of the acquired beam ID with a higher priority; that is, the transmission schedule information is corrected so that the transmission frequency is increased for the acquired beam ID.

As a result, the user terminal 3 which was once disconnected from the small cell base station can receives a synchronization down signal transmitted from the small cell base station 1 at an earlier timing, thereby shortening the time required to establish a reconnection between the user terminal 3 and the cell base station.

Second Embodiment

Figure 13:
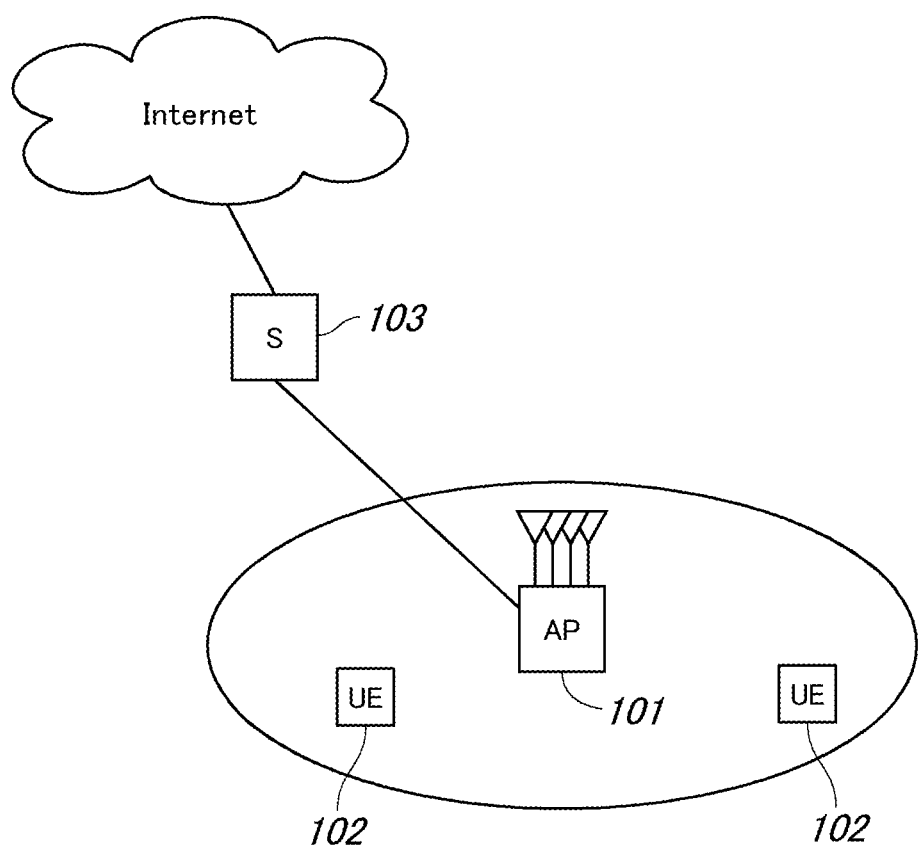
FIG. 13 is a diagram showing a general configuration of a communication system according to a second embodiment of the present invention.

Next, a second embodiment of the present invention will be described. FIG. 13 is a diagram showing a general configuration of a communication system according to a second embodiment of the present invention. Except for what will be discussed here, the configuration of the present embodiment is the same as that of the first embodiment.

In the first embodiment of the present invention, beam control for controlling transmission beams formation based on transmission schedule information is applied to transmission in a cellular mobile communication system, in particular, applied to transmission of down control signals from a small cell base station 1 using wireless communication technology for 5G systems (fifth generation mobile communication systems), whereas, in the present embodiment, beam control for controlling transmission beams formation based on transmission schedule information is applied to transmission of down control signals from an access point 101 (base station apparatus) using a wireless LAN communication scheme, in particular, a WiGig (Registered Trademark) communication scheme.

The access point 101 communicates with a user terminal 102 (terminal apparatus) using a high frequency band such as 60 GHz band, and performs transmission beam forming control by using multiple antenna elements. The access point 101 is connected to the Internet via a server 103.

The server 103 functions as a control server for transmission control of a wireless LAN system and/or as an edge server for storing contents information. It should be noted that a configuration without this server 103 may also be adopted.

Moreover, by combining the communication system of the first embodiment with that of the second embodiment, a communication system may be configured such that a user terminal 102 can use the small cell base station 1 and the macro cell base station 2 as well as the access point 101. In this case, wireless LAN is used for traffic accommodation for backhaul networks of the high frequency base stations as well as for traffic accommodation for the user terminal 102.

In such a communication system, in order to determine an optimum beam pattern for wireless communication between the access point 101 and the user terminals 102, it is required to perform beam control by time-divisionally forming transmission beams so as to makes a rotation of the transmission beam. Thus, the system requires longer time before starting transmission and reception becomes longer. Furthermore, since the optimum beam pattern varies depending on the locations of the user terminals 102, the system requires is required to execute the optimum beam pattern determination process every time the user terminals 102 move, resulting in a longer time used for performing beam control.

In view of these inconveniences, in the present embodiment, the system performs beam control (beam forming) controlling formation of transmissions beams used to transmit down signals from the access point 101 in the same manner as in the first embodiment. In particular, in the present embodiment, the system performs a sector sweep (SLS: Sector Level Sweep) to search for user terminals 102 as communication partners of the access point 101, and perform beam control based on a transmission schedule to control transmission of down signals (control signals) for SLS (hereinafter "SLS down signal(s)") from the access point 101.

Figure 14:
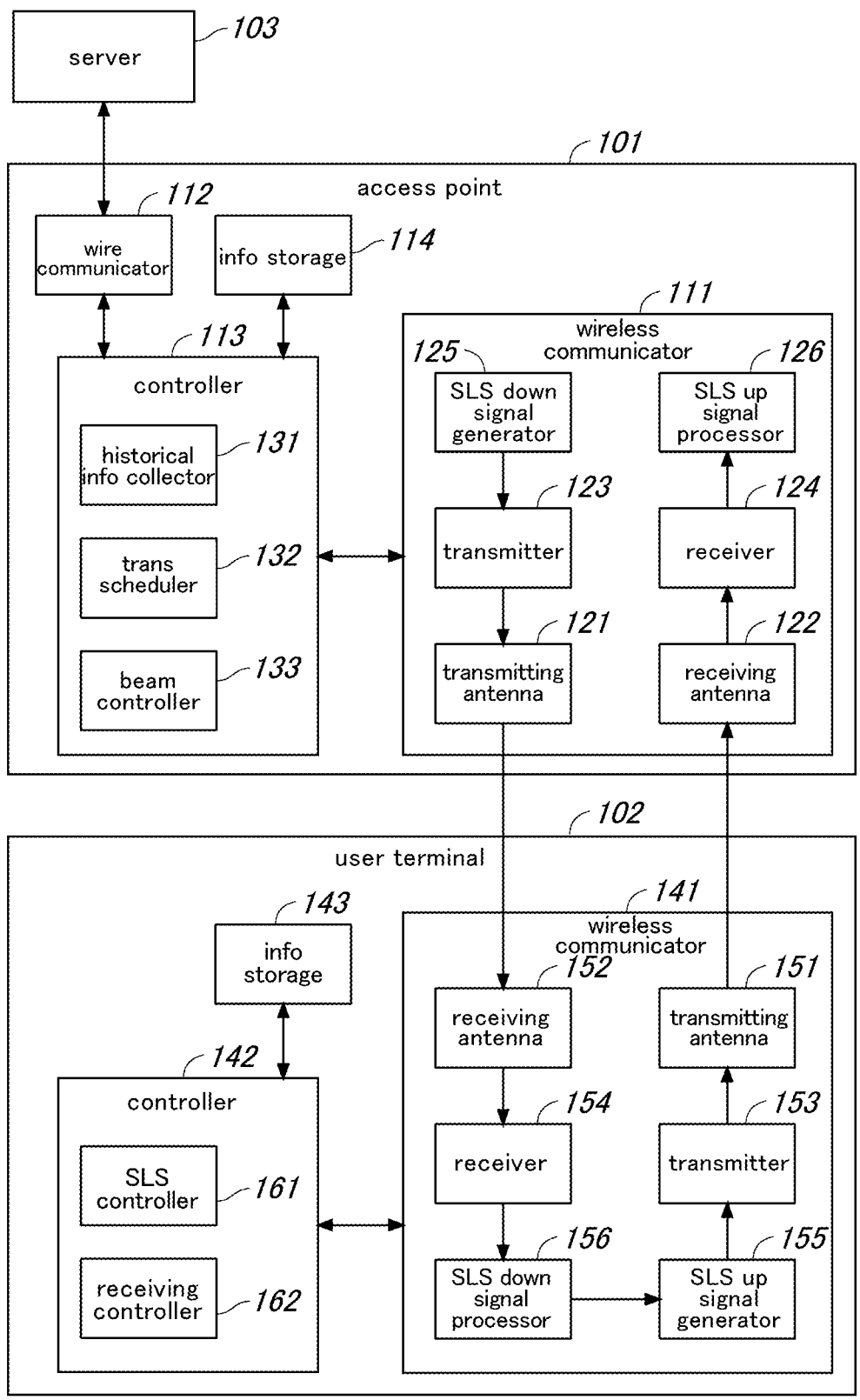
FIG. 14 is a block diagram showing a schematic configuration of an access point 101 and a user terminal 102.

Next, a schematic configuration of an access point 101 and a user terminal 102 will be described. FIG. 14 is a block diagram showing a schematic configuration of an access point 101 and a user terminal 102.

The access point 101 includes a wireless communicator 111, a wire communicator 112, a controller 113, and an information storage 114.

The wireless communicator 111 includes a transmitting antenna 121, a receiving antenna 122, a transmitter 123, a receiver 124, an SLS down signal generator 125 for generating SLS down signals, and an SLS up signal processor 126 for processing SLS up signals.

As in the first embodiment, the wireless communicator 111 is provided with a multi-element antenna for use in Massive-MIMO communication systems, which is used to perform beam forming, and the transmitting antenna 121 and the receiving antenna 122 are multi-element antennas.

The SLS down signal generator 125 generates an SLS down signal including a sector ID. The transmitting antenna 121 and the transmitter 123 are used to transmit the SLS down signal generated by the SLS down signal generator 125 to the user terminal 102. The receiving antenna 122 and the receiver 124 are used to receive an SNS up signal transmitted from the user terminal 102. The SLS up signal processor 126 performs a signal processing operation on the SLS up signal received by the receiving antenna 122 and the receiver 124. In the present embodiment, the sector ID is extracted from the SLS up signal.

The wire communicator 112 communicates with the server 103. In the present embodiment, the wire communicator 112 receives auxiliary information transmitted from the server 103.

The information storage 114 stores historical information (sector IDs extracted from SNS up signals), transmission schedule information, programs executable by the controller 113, and other information.

The controller 113 includes a historical information collector 131, a transmission scheduler 132, and a beam controller 133. The controller 113 is implemented by a processor, and each part of the controller 113 is implemented by causing the processor to execute a program stored in the information storage 114.

The historical information collector 131 stores beam IDs, which are extracted from SLS up signals by the SLS up signal processor 126, in the information storage 114 as historical information.

The transmission scheduler 132 generates transmission schedule information based on the historical information stored in the information storage 114. The transmission schedule information specifies presence or absence of transmission for each sector ID in each scan of one cycle of the transmission schedule.

The beam controller 133 performs beam control (beam forming), controlling formation of transmission beams used to transmit SLS down signals based on the transmission schedule information generated by the transmission scheduler 132. Specifically, the beam controller generates a BF weight for forming a transmission beam for a sector ID specified to perform transmission of an SLS down signal in the transmission schedule information.

It should be noted that a sector ID identifies a sector to which transmission is to be made, indicates the reachable area of a transmission beam, and has a corresponding transmission beam, which means a sector ID has the substantially same technical significance as a beam ID of the first embodiment.

The user terminal 102 includes a wireless communicator 141, a controller 142, and an information storage 143.

The information storage 143 stores transmission schedule information and programs executable by the controller 142.

The wireless communicator 141 includes a transmitting antenna 151, a receiving antenna 152, a transmitter 153, a receiver 154, an SLS up signal generator 155, and an SLS down signal processor 156.

The receiving antenna 152 and the receiver 154 are used to receive SLS down signals transmitted from the access point 101. The SLS down signal processor 156 performs a signal processing operation on SLS down signals received by the receiving antenna 152 and the receiver 154. In the present embodiment, the SLS down signal processor detects an SLS down signal with a maximum SNR (Signal to Noise Ratio, Signal Power to Noise Power Ratio), which represents the quality of a radio wave signal, among multiple received SLS down signals, and extracts the sector ID from the detected SLS down signal. The SLS up signal generator 155 generates an SLS up signal including a sector ID and the SNR acquired by the SLS down signal processor 156. The transmitting antenna 151 and the transmitter 153 are used to transmit the SLS up signal generated by the SLS up signal generator 155.

The controller 142 includes an SLS controller 161 and a receiving controller 162. The controller 142 is implemented by a processor, and each part of the controller 142 is implemented by causing the processor to execute a program stored in the information storage 143.

The SLS controller 161 controls a sector sweep operation and notifies the SLS up signal generator 155 and the SLS down signal processor 156 of control information required for a sector sweep operation.

The receiving controller 162 controls, based on the transmission schedule information and by using the receiving antenna 152 and the receiver 154, timing of observation of SLS down signals transmitted from the access point 101. In some cases, a user terminal 102 may be capable of using the macro cell base station 2, thereby enabling the user terminal 102 to acquire the transmission schedule information from the access point 101 via the macro cell base station 2.

Third Embodiment

Figure 15:
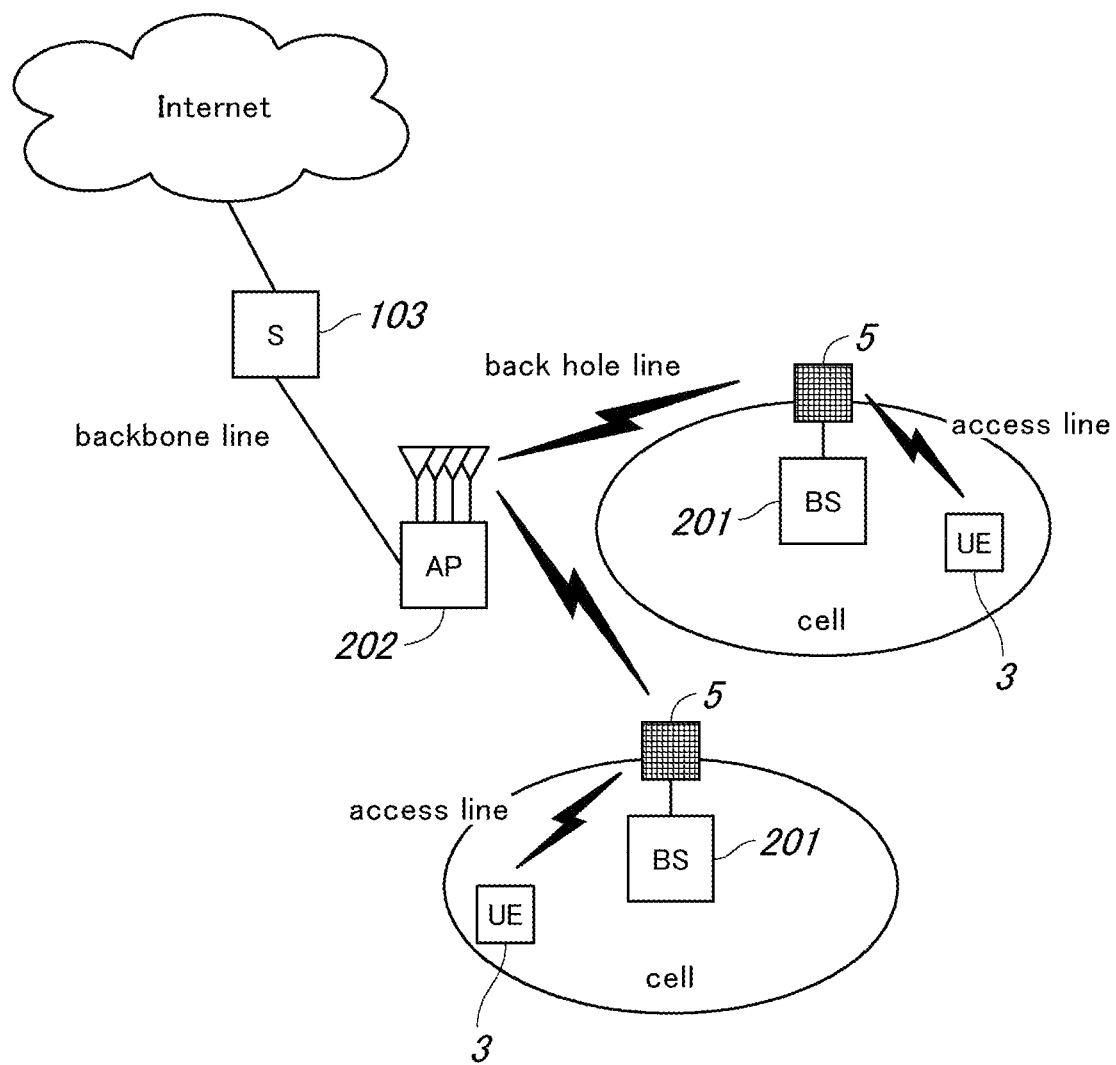
FIG. 15 is a diagram showing a general configuration of a communication system according to a third embodiment of the present invention.
Figure 16:
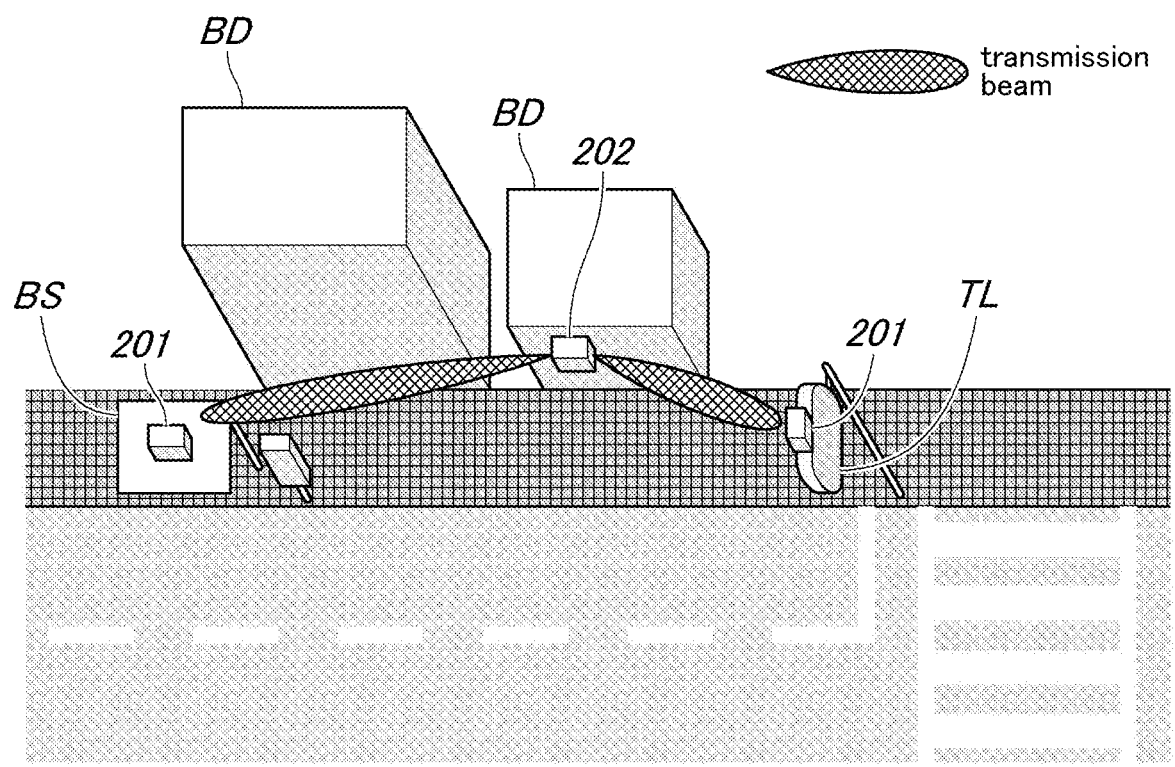
FIG. 16 is an explanatory view showing an example of installation of the first base stations 201 and the second base station 202.

Next, a third embodiment of the present invention will be described. FIG. 15 is a diagram showing a general configuration of a communication system according to the third embodiment of the present invention. FIG. 16 is an explanatory view showing an example of installation of the first base stations 201 and the second base station 202. Except for what will be discussed here, the configuration of the present embodiment is the same as that of the first embodiment.

In the first embodiment, transmission schedule control is applied to transmission of control signals in access networks connecting the small cell base station 1 with the user terminals 3, whereas, in the present embodiment, transmission schedule control is applied to transmission of control signals in backhaul networks connecting the access networks with backbone networks.

As shown in FIG. 15, a communication system according to the present embodiment includes a first base station 201 (subordinate base station apparatus) and a second base station 202 (base station apparatus). The first base station 201 communicates with user terminals 3 using a cellular mobile communication system, in particular, a system using a wireless communication scheme for 5G systems (fifth generation mobile communication systems). The second base station 202 is an access point configured to communicate with the first base station 201 by using a wireless LAN communication scheme, in particular, a communication scheme using a high frequency band such as a WiGig (Registered Trademark) communication scheme and the second base station 202 relays communication between the Internet (upper communication network) and the first base station 201.

It should be noted that the wireless communication scheme used for communication between the first base station 201 and the user terminal 3 and that used for communication between the first base station 201 and the second base station 202 are not limited to the above-described examples in the present embodiment.

In the example shown in FIG. 16, the first base stations 201 are installed at a bus stop BS and a traffic light TL, respectively. A second base station 202 is installed on the wall surface of a building BD. Under the condition, since using wire to connect the first base stations 201 with the second base station 202 is difficult, wireless communication is performed between the first base stations 201 and the second base station 202.

In this case, since the first base stations 201 are fixed, among the transmission beams transmitted from the second base station 202, only the transmission beams in the directions towards the locations of the first base stations 201 are used. Thus, priority is given to the transmission beams in the directions towards the first base stations 201; that is, transmission schedule information is set, by eliminating transmission of the transmission beams in the directions where the first base stations 201 are not present, so as to increase the frequencies of transmission of the transmission beams in the directions towards the first base stations 201.

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

For example, although in the above-described embodiments, different beam IDs or sector IDs are added to signals as beam identification information for identifying transmission beam having different directions, beam identification information is not limited to such beam IDs or sector IDs. For example, transmission beams (channels) can be identified by preparing different types of synchronization signals assigned to different sequences for respective transmission beams in advance, and examples of types of synchronization signals include primary synchronization signal (PSS: Primary Synchronization Signal) and secondary synchronization signal (SSS: Secondary Synchronization Signal), which are synchronization down signals used in a cell search in an LTE communication scheme. BF weights can be also used to identify transmission beams.

Also, although, in the above-described embodiments, synchronization down signals and SLS down signals are shown as examples of signals on which transmission schedule control is performed; that is, examples of down signals common to all terminal apparatuses (user terminals 3, 102) present in a communication area of a base station apparatus (small cell base station 1 and access point 101), such signals for which transmission schedule control is performed on transmission of transmission beams are not limited to these signals. For example, such a signal for which transmission schedule control is performed on transmission of transmission beams may be a notification signal transmitted from a base station apparatus to all terminal apparatuses present in its communication area.

Furthermore, in the above-described embodiments, in order to generate transmission schedule information, the transmission scheduler 32 in a small cell base station 1 and the transmission scheduler 132 in an access point 101 are used. However, instead of configuring an apparatus to generate transmission schedule information in this way, transmission schedule information may be created by a system operator with reference to historical information.

INDUSTRIAL APPLICABILITY

A base station apparatus, a terminal apparatus, and a transmission control method according to the present invention achieve the effects to shorten a waiting time until a terminal apparatus receives a signal transmitted in a time-divisional manner from a base station apparatus and ensure that a transmission beam is transmitted to a direction towards where a terminal apparatus is present, and are useful as a base station apparatus for time-divisionally transmitting a down signal to multiple terminal apparatuses and multiple subordinate base station apparatuses present in a communication area concurrently with changing a transmission beam direction, wherein the down signal is common to the multiple terminal apparatuses and the multiple subordinate base station apparatuses; a terminal apparatus for transmitting an up signal to and receiving a down signal from a base station apparatus; and a transmission control method used in a base station apparatus for time-divisionally transmitting a down signal to multiple terminal apparatuses present in a communication area concurrently with changing a transmission beam direction, wherein the down signal is common to the multiple terminal apparatuses.

GLOSSARY 1 small cell base station (base station apparatus)
2 macro cell base station
3 user terminal (terminal apparatus)
11 wireless communicator
13 controller
14 information storage
31 historical information collector
32 transmission scheduler
33 beam controller
41 small cell communicator
43 controller
44 information storage
61 cell search controller
62 receiving controller
101 access point (base station apparatus)
102 user terminal (terminal apparatus)
111 wireless communicator
113 controller
114 information storage
131 historical information collector
132 transmission scheduler
133 beam controller
141 wireless communicator
142 controller
143 information storage
161 SLS controller
162 receiving controller
201 first base station (subordinate base station apparatus)
202 second base station (base station apparatus)

The invention claimed is:

1. A base station apparatus for time-divisionally transmitting a down signal to a plurality of terminal apparatuses present in a communication area concurrently with changing a transmission beam direction, the down signal being common to the plurality of terminal apparatuses, the base station apparatus comprising:
a wireless communicator configured to time-divisionally transmit the down signal concurrently with changing the transmission beam direction;
an information storage configured to store transmission schedule information which specifies transmission timing of transmission beams, wherein the transmission timing is determined based on historical information on presence or absence of one or more of the terminal apparatuses in respective sectors, each sector being part of a reachable area of past transmission beams, in such a manner as to eliminate transmission of the transmission beam to a sector with a lower frequency of presence of one or more of the terminal apparatuses; and
a controller configured to control, based on the transmission schedule information, the transmission beams when the base station apparatus transmits the down signal.

2. The base station apparatus according to claim 1, wherein the transmission schedule information is set so as to increase a frequency of transmission of the transmission beam to a sector with a higher frequency of presence of one or more of the terminal apparatuses and decrease a frequency of transmission of the transmission beam to a sector with a lower frequency of presence of one or more of the terminal apparatuses.

3. The base station apparatus according to claim 1, wherein the transmission schedule information is set such that, during one cycle of a transmission schedule, a plurality of scans is performed over an entirety of the communication area and that, in at least one scan, the transmission beams are transmitted to all the sectors of the communication area.

4. The base station apparatus according to claim 1, wherein the wireless communicator is configured to transmit the down signal, the down signal including a beam ID which identifies a transmission beam, and to receive an up signal including the beam ID extracted from the down signal received at the terminal apparatus; and
wherein the controller is configured to store the beam ID extracted from the up signal as the historical information in the information storage.

5. The base station apparatus according to claim 4, wherein the controller is configured to generate, when a system including the base station apparatus is introduced, an initial piece of the transmission schedule information based on the historical information stored in the information storage during a prescribed collection period, and to periodically update, during normal operations, the transmission schedule information based on the historical information at prescribed timing, the historical information being stored in the information storage.

6. The base station apparatus according to claim 5, wherein the transmission schedule information is set such that, during one cycle of a transmission schedule, a plurality of scans is performed over an entirety of the communication area and that, in at least one scan, the transmission beams are transmitted to all the sectors of the communication area, and
wherein the controller is configured to update, during normal operations, the transmission schedule information once in each cycle of the transmission schedule.

7. The base station apparatus according to claim 4, wherein an up signal and the down signal are control signals transmitted and received between the base station apparatus and a terminal apparatus when the base station apparatus establishes an initial connection with the terminal apparatus after the terminal apparatus is moved into the communication area.

8. The base station apparatus according to claim 4, wherein the up signal and the down signal are control signals transmitted and received between the base station apparatus and a terminal apparatus when a reconnection is established between the base station apparatus and the terminal apparatus after a disconnection occurred therebetween.

9. The base station apparatus according to claim 8, wherein the transmission schedule information is set based on historical information representing correlations between respective combinations of sectors where disconnections occurred between the base station apparatus and the terminal apparatuses and sectors where reconnections occurred therebetween, and wherein the transmission schedule information is set so as to increase a frequency of transmission of the transmission beam to a sector having a high correlation with another sector where one or more of the terminal apparatuses were present when disconnections occurred between the terminal apparatuses and the base station apparatus.

10. A base station apparatus for time-divisionally transmitting a down signal to a plurality of subordinate base station apparatuses present in a communication area concurrently with changing a transmission beam direction, the down signal being common to the plurality of subordinate base station apparatuses, the base station apparatus comprising:
- a wireless communicator configured to time-divisionally transmit the down signal concurrently with changing the transmission beam direction;
- an information storage configured to store transmission schedule information which specifies transmission timing of transmission beams, wherein the transmission timing is determined based on historical information on presence or absence of one or more of the subordinate base station apparatuses in respective sectors, each sector being part of a reachable area of past transmission beams, in such a manner as to eliminate transmission of the transmission beam to a sector with a lower frequency of presence of one or more of the subordinate base station apparatuses; and
- a controller configured to control, based on the transmission schedule information, the transmission beams when the base station apparatus transmits the down signal.

11. A system including a base station apparatus and a plurality of terminal apparatuses for transmitting an up signal to and receiving a down signal from the base station apparatus, wherein the base station is configured to time-divisionally transmit a down signal to the plurality of apparatuses present in a communication area concurrently with changing a transmission beam direction, the down signal being common to the plurality of terminal apparatuses, wherein the base station apparatus comprises:
- a wireless communicator configured to time-divisionally transmit the down signal concurrently with changing the transmission beam direction;
- an information storage configured to store transmission schedule information which specifies transmission timing of transmission beams, wherein the transmission timing is determined based on historical information on presence or absence of one or more of the terminal apparatuses in respective sectors, each sector being part of a reachable area of past transmission beams, in such a manner as to eliminate transmission of the transmission beam to a sector with a lower frequency of presence of one or more of the terminal apparatuses; and
- a base station controller configured to control, based on the transmission schedule information, the transmission beams when the base station apparatus transmits the down signal, and wherein the terminal apparatus comprises:
- a receiver configured to receive the down signal transmitted from the base station apparatus;
- a transmitter configured to transmit, upon receiving the down signal, the up signal to the base station;
- an information storage configured to store transmission schedule information which specifies transmission timing of the down signal from the terminal apparatus; and
- a terminal controller configured to control, based on the transmission schedule information, timing of observation of the down signal at the receiver.

12. A transmission control method used in a base station apparatus for time-divisionally transmitting a down signal to a plurality of terminal apparatuses present in a communication area concurrently with changing a transmission beam direction, the down signal being common to the plurality of terminal apparatuses, the transmission control method comprising:
- collecting historical information on presence or absence of one or more of the terminal apparatuses in respective sectors, each sector being part of a reachable area of past transmission beams;
- generating transmission schedule information which specifies transmission timing of transmission beams, wherein the transmission schedule information is determined based on the historical information, in such a manner as to eliminate transmission of the transmission beam to a sector with a lower frequency of presence of one or more of the terminal apparatuses; and
- controlling, based on the transmission schedule information, the transmission beams when the base station apparatus transmits the down signal.

* * * * *